US012529434B2

(12) United States Patent
Roesner et al.

(10) Patent No.: US 12,529,434 B2
(45) Date of Patent: Jan. 20, 2026

(54) SUPPORT BRACKET FOR FLUID CONDUIT ASSEMBLY

(71) Applicant: Scout Surface Solutions, LLC, Joshua, TX (US)

(72) Inventors: Thomas George Roesner, Cypress, TX (US); David Lane Evans, Conroe, TX (US); Jason Thetford, Cleburne, TX (US); John Paul Stratton, Alvarado, TX (US); Michael James Cornelssen, Spring, TX (US)

(73) Assignee: Scout Surface Solutions, LLC, Joshua, TX (US)

( * ) Notice: Subject to any disclaimer, the term of this patent is extended or adjusted under 35 U.S.C. 154(b) by 0 days.

(21) Appl. No.: 19/079,861

(22) Filed: Mar. 14, 2025

(65) Prior Publication Data

US 2025/0207691 A1   Jun. 26, 2025

Related U.S. Application Data

(63) Continuation of application No. PCT/US2023/032783, filed on Sep. 14, 2023.

(Continued)

(51) Int. Cl.
*F16L 3/10* (2006.01)
*E21B 43/26* (2006.01)

(52) U.S. Cl.
CPC ......... *F16L 3/1091* (2013.01); *E21B 43/2607* (2020.05)

(58) Field of Classification Search
CPC ......... F16L 3/1083; F16L 3/1091; F16L 3/14; E21B 43/2607

(Continued)

(56) References Cited

U.S. PATENT DOCUMENTS

| 714,508 A | * | 11/1902 | Moser | ..................... E21B 33/04 166/88.1 |
| 1,561,850 A | * | 11/1925 | Guttman | ................... F16L 3/24 248/55 |

(Continued)

FOREIGN PATENT DOCUMENTS

| JP | 2002156483 A | 5/2002 |
| JP | 2016166626 A | 9/2016 |
| KR | 101107037 B1 | 1/2012 |

OTHER PUBLICATIONS

International Search Report for International Application No. PCT/US2023/032783, mailed Jan. 4, 2024, 12 pgs.

(Continued)

*Primary Examiner* — Kenneth Rinehart
*Assistant Examiner* — Nicole Gardner
(74) *Attorney, Agent, or Firm* — Fletcher Yoder, P.C.

(57) ABSTRACT

A support bracket for a fluid supply system includes an arm configured to extend across and engage with an inlet module of the fluid supply system. The inlet module includes first and second high-pressure inlets positioned on opposite sides of the inlet module. The support bracket further includes first and second extensions extending from the arm in a direction along a vertical axis, a first support coupled to the first extension, and a second support coupled to the second extension. The first support is configured to at least partially circumscribe a first connector coupled to the first high-pressure inlet to transfer a first load from the first connector to the inlet module, and the second support is configured to at least partially circumscribe a second connector coupled to the second high-pressure inlet to transfer a second load from the second connector to the inlet module.

20 Claims, 11 Drawing Sheets

Related U.S. Application Data

(60) Provisional application No. 63/406,601, filed on Sep. 14, 2022.

(58) Field of Classification Search
USPC .......................................................... 285/114
See application file for complete search history.

(56) References Cited

U.S. PATENT DOCUMENTS

| | | | | |
|---|---|---|---|---|
| 2,937,835 A * | 5/1960 | Csmereka | ............ | F16L 3/2235 |
| | | | | 248/68.1 |
| 3,249,370 A * | 5/1966 | Brogden | ............... | F16L 55/005 |
| | | | | 24/485 |
| 4,194,712 A * | 3/1980 | Elvegaard | ............ | F16L 3/2235 |
| | | | | 248/68.1 |
| 4,432,571 A * | 2/1984 | Davis | ...................... | F16L 21/08 |
| | | | | 285/283 |
| 4,457,338 A * | 7/1984 | Moller | ................ | F16L 27/0861 |
| | | | | 137/899 |
| 5,026,096 A * | 6/1991 | Lutz, II | ................ | F16L 21/002 |
| | | | | 285/373 |
| 5,247,727 A * | 9/1993 | Harris | .................... | B01D 65/00 |
| | | | | 29/259 |
| 5,560,162 A * | 10/1996 | Kemeny | ................ | F16L 3/1091 |
| | | | | 52/167.3 |
| 6,065,782 A * | 5/2000 | Allen, Jr. | .............. | F16L 3/1016 |
| | | | | 285/133.11 |
| 2005/0253380 A1* | 11/2005 | Gibb | ........................ | F16L 25/14 |
| | | | | 285/111 |
| 2006/0027713 A1* | 2/2006 | van Walraven | ........ | F16L 3/1091 |
| | | | | 248/56 |
| 2012/0217353 A1* | 8/2012 | Hennon | ................ | F16L 3/1075 |
| | | | | 29/428 |
| 2013/0187013 A1* | 7/2013 | Minami | .................... | F16L 5/10 |
| | | | | 248/70 |
| 2015/0000766 A1* | 1/2015 | Arizpe | ...................... | F16F 7/14 |
| | | | | 137/561 A |
| 2016/0238161 A1* | 8/2016 | Meyer | .................... | F16L 55/035 |
| 2017/0122060 A1* | 5/2017 | Dille | .................... | E21B 43/2607 |
| 2017/0204993 A1* | 7/2017 | Eljaouhari | .............. | F16L 3/237 |
| 2017/0370199 A1* | 12/2017 | Witkowski | .............. | F04B 15/02 |
| 2018/0187662 A1* | 7/2018 | Hill | ........................ | F04B 47/02 |
| 2018/0284817 A1* | 10/2018 | Cook | .................. | E21B 43/2607 |
| 2022/0049809 A1* | 2/2022 | Riedel, Jr. | ............. | F16L 55/041 |

OTHER PUBLICATIONS

U.S. Appl. No. 19/079,607, filed Mar. 14, 2025, Thomas George Roesner.

* cited by examiner

SUPPORT BRACKET FOR FLUID CONDUIT ASSEMBLY

CROSS-REFERENCE TO RELATED APPLICATIONS

This application is a continuation of International Application No. PCT/US23/32783, entitled "SUPPORT BRACKET FOR FLUID CONDUIT ASSEMBLY," filed Sep. 14, 2023, which claims priority from and the benefit of U.S. Provisional Application No. 63/406,601, entitled "SUPPORT BRACKET FOR FLUID CONDUIT ASSEMBLY," filed Sep. 14, 2022. Each of the foregoing applications is incorporated by reference in its entirety.

BACKGROUND

The present disclosure relates generally to a support bracket for a fluid conduit assembly of a fluid supply system.

Various resources (e.g., hydrocarbon gas, oil, etc.) may be extracted from subterranean formations by drilling wells into the subterranean formations. During production, one or more resources may flow from the subterranean formation to a wellhead via the well. The wellhead may include components (e.g., valves, connectors, etc.) configured to control flow of the one or more resources to storage and/or processing assemblies.

For a subterranean formation having low porosity and/or low permeability, and/or when flow of the one or more resources from a subterranean formation decreases, a well stimulation system may be employed to perform a well stimulation operation to fracture the subterranean formation, thereby increasing the flow of the one or more resources from the subterranean formation. The well stimulation system typically includes a well stimulation fluid supply system and a well stimulation tree. The well stimulation fluid supply system includes a fluid source configured to output fracturing fluid (e.g., including water, sand, proppant, acid, chemicals, additives, etc.) and one or more pumps configured to significantly increase the pressure of the fracturing fluid. The well stimulation fluid supply system is configured to output the high-pressure fracturing fluid to the well stimulation tree. The well stimulation tree is coupled to the wellhead and configured to direct the high-pressure fracturing fluid through the wellhead and the well to the subterranean formation.

Certain well stimulation fluid supply systems include a fluid conduit assembly having multiple low-pressure conduits and a high-pressure conduit. The low-pressure conduits may be disposed on opposite lateral sides of the high-pressure conduit, and the low-pressure conduits may be fluidly coupled to an inlet manifold. The inlet manifold may be configured to receive the fracturing fluid from the fluid source and to provide the fracturing fluid to the low-pressure conduits. One or more low-pressure conduits positioned on a first lateral side of the high-pressure conduit may provide the fracturing fluid to a first set of pumps on the first lateral side of the high-pressure conduit, and one or more low-pressure conduits positioned on a second lateral side of the high-pressure conduit may provide the fracturing fluid to a second set of pumps on the second lateral side of the high-pressure conduit. The pumps may significantly increase the pressure of the fracturing fluid and output the high-pressure fracturing fluid to the high-pressure conduit. The high-pressure conduit, in turn, may output the high-pressure fracturing fluid to the well stimulation tree. Each pump may be fluidly coupled to a respective high-pressure inlet of the high-pressure conduit via a respective high-pressure hose or pipe. Due to the high pressure of the fracturing fluid and/or the weight and/or movement of the hoses/pipes coupled to the high-pressure inlets, the high-pressure inlets may experience increased loads (e.g., lateral load(s), vertical load(s), longitudinal load(s)), thereby resulting in frequent maintenance and/or replacement of connectors at the inlets. As a result, the costs associated with maintaining the fluid supply system may be increased due to the costs associated with maintaining and/or replacing the connectors.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a support bracket for a fluid supply system includes an arm configured to extend across and engage with an inlet module of the fluid supply system. The inlet module comprises a first high-pressure inlet and a second high-pressure inlet positioned on opposite sides of the inlet module. The support bracket further includes a first extension and a second extension extending from the arm in a direction along a vertical axis and a first support coupled to the first extension and a second support coupled to the second extension. The first support is configured to at least partially circumscribe a first connector coupled to the first high-pressure inlet and the second support is configured to at least partially circumscribe a second connector coupled to the second high-pressure inlet. The support bracket is configured to transfer a first load from the first connector to the inlet module and a second load from the second connector to the inlet module.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
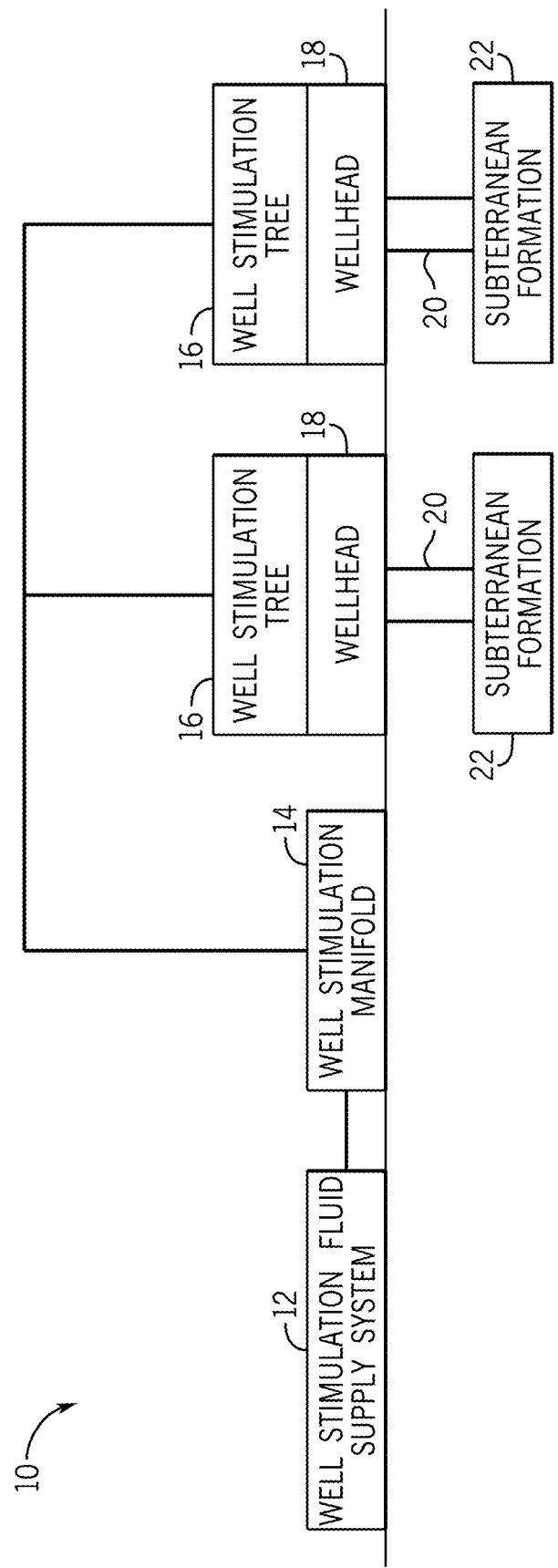
FIG. 1 is a block diagram of an embodiment of a well stimulation system, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As used herein, the terms "approximately," "generally," "substantially," and so forth, are intended to convey that the property value being described may be within a relatively small range of the property value, as those of ordinary skill would understand. For example, when a property value is described as being "approximately" equal to (or, for example, "substantially similar" to) a given value, this is intended to convey that the property value may be within +/−5%, within +/−4%, within +/−3%, within +/−2%, within +/−1%, or even closer, of the given value. Similarly, when a given feature is described as being "substantially parallel" to another feature, "generally perpendicular" to another feature, and so forth, this is intended to convey that the given feature is within +/−5%, within +/−4%, within +/−3%, within +/−2%, within +/−1%, or even closer, to having the described nature, such as being parallel to another feature, being perpendicular to another feature, and so forth. Mathematical terms, such as "parallel" and "perpendicular," should not be rigidly interpreted in a strict mathematical sense, but should instead be interpreted as one of ordinary skill in the art would interpret such terms. For example, one of ordinary skill in the art would understand that two lines that are substantially parallel to each other are parallel to a substantial degree, but may have minor deviation from exactly parallel.

Certain well stimulation fluid supply systems include a fluid conduit assembly having one or more low-pressure conduits and a high-pressure conduit. The low-pressure conduit(s) may be configured to receive fracturing fluid from a fluid source and to direct the fracturing fluid to pumps configured to significantly increase the pressure of the fracturing fluid and to output the high-pressure fracturing fluid to the high-pressure conduit. The high-pressure conduit, in turn, may output the high-pressure fracturing fluid to a well stimulation tree. Each pump may be fluidly coupled to a respective high-pressure inlet of the high-pressure conduit via a high-pressure hose or a high-pressure pipe. Due to the high pressure of the fracturing fluid and/or the weight and/or movement of the hoses/pipes coupled to the high-pressure inlets, the high-pressure inlets may experience increased loads (e.g., lateral load(s), vertical load(s), longitudinal load(s)), thereby resulting in frequent maintenance and/or replacement of connectors at the inlets. Accordingly, present embodiments are directed to a support bracket configured to reduce loads (e.g., lateral load(s), vertical load(s), longitudinal load(s)) on high-pressure inlets of the high-pressure conduit, thereby increasing longevity of the connectors. As a result, the costs associated with maintaining and/or replacing the connectors may be reduced.

FIG. 1 is a block diagram of an embodiment of a well stimulation system 10. In the illustrated embodiment, the well stimulation system 10 includes a well stimulation fluid supply system 12, a well stimulation manifold 14, and two well stimulation trees 16. The well stimulation fluid supply system 12 is configured to provide high-pressure fracturing fluid to the well stimulation manifold 14, and the well stimulation manifold 14, in turn, is configured to provide the high-pressure fracturing fluid to the well stimulation trees 16. As illustrated, each well stimulation tree 16 is coupled to a respective wellhead 18, and each well stimulation tree 16 is configured to direct the high-pressure fracturing fluid through the respective wellhead 18 and a respective well 20 to a respective subterranean formation 22. The high-pressure fracturing fluid may fracture the subterranean formation 22 (e.g., by increasing the size of natural fractures, by forming new fractures, etc.). As a result, the production of resources (e.g., hydrocarbon gas, oil, etc.) from the subterranean formation may be increased.

In the illustrated embodiment, the well stimulation system 10 includes two well stimulation trees 16 fluidly coupled to the well stimulation manifold 14. However, in other embodiments, the well stimulation system 10 may include more or fewer well stimulation trees 16 (e.g., 1, 3, 4, or more) fluidly coupled to the well stimulation manifold 14. In addition, while the well stimulation system 10 includes a single well stimulation manifold 14 in the illustrated embodiment, in other embodiments, the well stimulation system 10 may include additional well stimulation manifolds (e.g., in which each well stimulation manifold is fluidly coupled to one or more well stimulation trees). Furthermore, in certain embodiments, the well stimulation manifold 14 may be omitted, and the well stimulation fluid supply system 12 may be directly fluidly coupled to a single well stimulation tree 16. In embodiments having multiple well stimulation trees and no well stimulation manifold, the well stimulation fluid supply system 12 may be fluidly coupled to each well stimulation tree 16 individually in a cyclical/repeating pattern.

In certain embodiments, the well stimulation fluid supply system 12 includes one or more fluid sources, fluid pumps, and a fluid conduit assembly. Each fluid source is configured to output a respective low-pressure fracturing fluid to the fluid conduit assembly, and the fluid conduit assembly is configured to provide the low-pressure fracturing fluid(s) to the fluid pumps. The fluid pumps are configured to significantly increase the pressure and, in certain embodiments, flow rate, of the fracturing fluid(s), and to provide high-pressure fracturing fluid(s) to the fluid conduit assembly. In embodiments in which multiple fracturing fluids are provided to the fluid conduit assembly, the fluid conduit assembly is configured to mix the fracturing fluids into a single high-pressure fracturing fluid. In addition, the fluid conduit assembly is configured to provide the high-pressure fracturing fluid to the well stimulation tree(s) (e.g., via the well stimulation manifold).

In certain embodiments, the fluid conduit assembly includes a low-pressure conduit assembly and a high-pressure conduit assembly. The low-pressure conduit assembly includes one or more low-pressure conduits, one or more low-pressure inlets, and multiple low-pressure outlets. The one or more low-pressure inlets are configured to direct a low-pressure fluid (e.g., low-pressure fracturing fluid) from a fluid source to the low-pressure conduit(s), and the low-pressure outlets are configured to direct the low-pressure fluid from the conduit to the fluid pumps. In addition, the high-pressure conduit assembly includes a high-pressure conduit, multiple high-pressure inlets, and one or more high-pressure outlets. The high-pressure inlets are configured to direct high-pressure fluid from the fluid pumps to the high-pressure conduit, and the one or more high-pressure outlets are configured to direct the high-pressure fluid toward the well (e.g., via the well stimulation manifold and the well stimulation tree). In certain embodiments, at least one first high-pressure inlet is positioned on a first lateral side of the high-pressure conduit, and at least one second high-pressure inlet is positioned on a second lateral side of the high-pressure conduit, opposite the first lateral side. However, in other embodiments, the high-pressure inlets may be positioned on a single lateral side of the high-pressure conduit.

While the fluid conduit assembly is disclosed herein with regard to a well stimulation system (e.g., as an element of a well stimulation fluid supply system), the fluid conduit assembly, as described herein, may also be employed within any other suitable system configured to provide fluid to a well. For example, in certain embodiments, the fluid conduit assembly may be employed within a well intervention fluid supply system of a well intervention system. The well intervention system may provide intervention fluid (e.g., including water, acid, sand, proppant, etc.) to a well to further fracture the subterranean formation, thereby increasing production of resources from the well.

Figure 2:
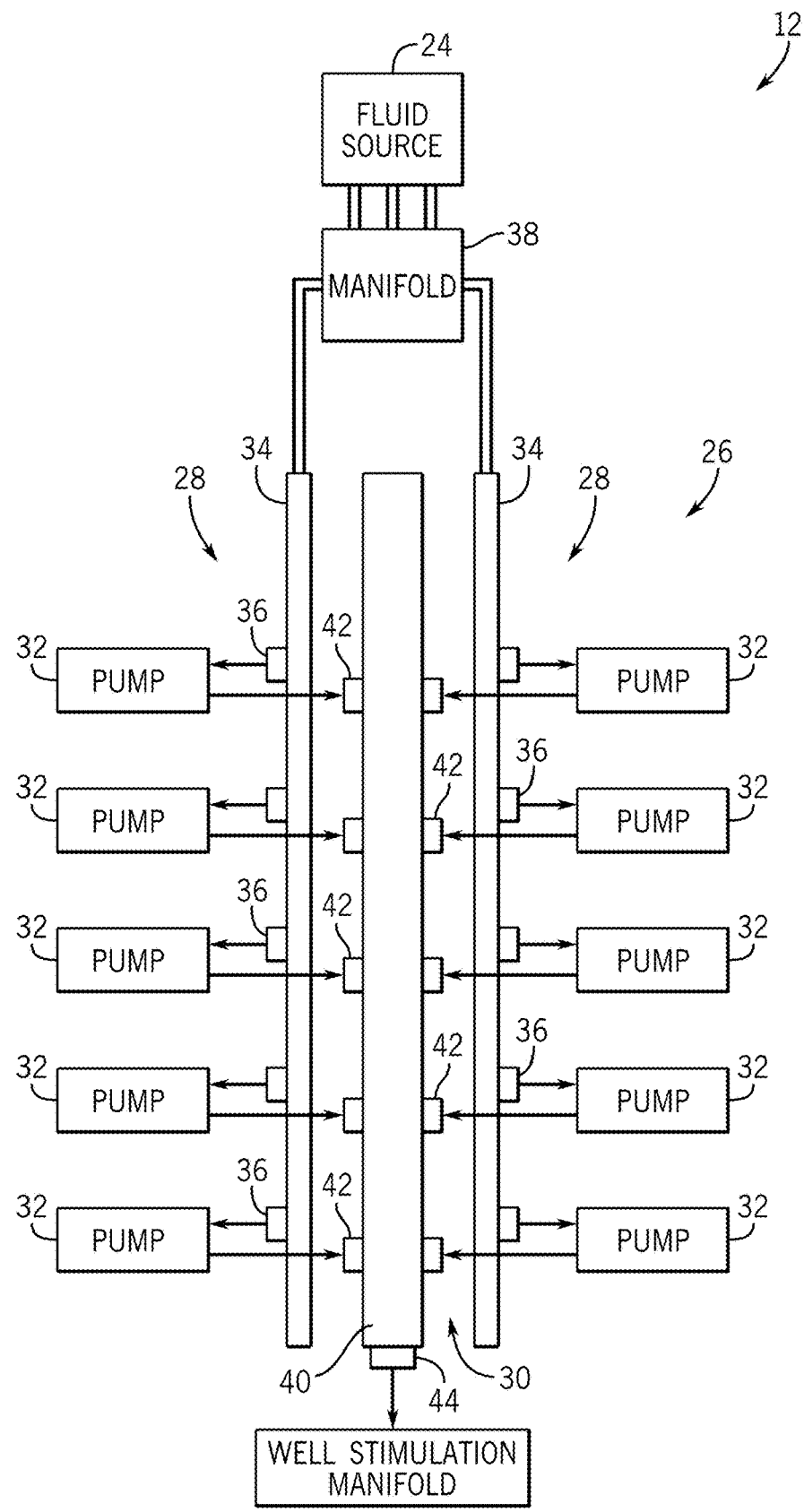
FIG. 2 is a block diagram of an embodiment of a well stimulation fluid supply system that may be employed within the well stimulation system of FIG. 1, in accordance with aspects of the present disclosure.

FIG. 2 is a block diagram of an embodiment of a well stimulation fluid supply system 12 that may be employed within the well stimulation system of FIG. 1. In the illustrated embodiment, the well stimulation fluid supply system 12 includes a fluid source 24. The fluid source 24 is configured to output low-pressure fluid (e.g., low-pressure fracturing fluid). The fracturing fluid may include water and proppant (e.g., sand, ceramic particles, etc.). The fracturing fluid may also include one or more chemical additives (e.g., acid, etc.). In certain embodiments, the fluid source 24 includes a water source that may include one or more water tanks, one or more ponds, one or more pumps, other suitable component(s), or a combination thereof. In addition, in certain embodiments, the fluid source 24 includes a blending unit configured to blend the water with the proppant and/or the chemical additives to form the low-pressure fracturing fluid. The blending unit may also include one or more pumps configured to pump the fracturing fluid to a fluid conduit assembly of the fluid supply system 12.

For example, the well stimulation fluid supply system 12 includes a fluid conduit assembly 26 having a low-pressure conduit assembly 28 and a high-pressure conduit assembly 30 (e.g., high-pressure monobore conduit assembly). The well stimulation fluid supply system 12 also includes multiple fluid pumps 32. The low-pressure conduit assembly 28 is configured to receive the low-pressure fluid from the fluid source 24 and to output the low-pressure fluid to the fluid pumps 32, and the high-pressure conduit assembly 30 is configured to receive the high-pressure fluid (e.g., high-pressure fracturing fluid) from the fluid pumps 32. As previously discussed, each fluid pump 32 is configured to receive the low-pressure fluid, substantially increase the pressure of the fluid, and output the high-pressure fluid. In certain embodiments, one or more fluid pumps 32 may be mounted on a respective truck, and each truck may position the respective fluid pump(s) 32 at a location suitable for interfacing with the fluid conduit assembly 26. While the well stimulation fluid supply system 12 includes ten pumps 32 in the illustrated embodiment, in other embodiments, the well stimulation fluid supply system 12 may include more or fewer pumps 32 (e.g., 1, 2, 3, 4, 6, 8, 12, etc.).

In the illustrated embodiment, the low-pressure conduit assembly 28 includes low-pressure conduits 34 and low-pressure outlets 36. The well stimulation fluid supply system 12 includes a manifold 38 configured to direct the low-pressure fluid (e.g., low-pressure fracturing fluid) from the fluid source 24 to the low-pressure conduits 34. For example, the manifold 38 may receive the low-pressure fluid from the fluid source 24 via respective hoses and/or pipes (e.g., steel pipes, etc.). In addition, the low-pressure outlets 36 are configured to direct the low-pressure fluid from the low-pressure conduits 34 to the fluid pumps 32. For example, the low-pressure outlets 36 may output the low-pressure fluid to the fluid pumps 32 via respective hoses. While the low-pressure conduit assembly 28 includes two low-pressure conduits 34 in the illustrated embodiment, in other embodiments the low-pressure conduit assembly 28 may include fewer or more conduits (e.g., 1, 3, 4, or more). For example, in certain embodiments, the low-pressure conduit assembly 28 may include a single monobore low-pressure conduit. In such embodiments, the manifold may be reconfigured or omitted. Further, each low-pressure conduit 34 may have any suitable inner diameter. In certain embodiments, each low-pressure conduit 34 has a substantially constant inner diameter. Accordingly, the cost of each low-pressure conduit may be substantially reduced (e.g., as compared to a low-pressure conduit having a diameter that increases or decreases along the length of the conduit from the low-pressure inlet(s) toward the low-pressure outlets). However, in other embodiments, the inner diameter of at least one low-pressure conduit may vary along the length of the low-pressure conduit (e.g., one section of the low-pressure conduit may have a larger inner diameter than another section of the low-pressure conduit). Furthermore, the low-pressure outlets 36 may have any suitable inner diameter. The low-pressure conduits 34 may be configured to accommodate a variety of flow rates (e.g., about 60 to about 120 barrels/minute) and/or a variety of pressures (e.g., about 80 psi to about 120 psi).

Furthermore, in the illustrated embodiment, the high-pressure conduit assembly 30 includes a high-pressure monobore conduit 40, high-pressure inlets 42, and a high-pressure outlet 44. The high-pressure inlets 42 are configured to direct the high-pressure fluid (e.g., high-pressure fracturing fluid) from the fluid pumps 32 to the high-pressure monobore conduit 40. In addition, the high-pressure outlet 44 is configured to direct the high-pressure fluid toward the well(s) via the fluid transfer assembly 14. As used herein, "monobore conduit" refers to a single respective longitudinal conduit within the fluid conduit assembly, as compared to a multi-bore conduit assembly having two or more longitudinal conduits (e.g., fluidly coupled to one another, such as via u-shaped tube(s), etc.). Accordingly, in the illustrated embodiment, the fluid conduit assembly 26 includes a single high-pressure conduit 40. However, in other embodiments, the high-pressure conduit assembly 30 may include multiple high-pressure conduits (e.g., 2, 3, 4, or more).

As discussed in detail below, the fluid supply system 12 includes connection assemblies, in which each connection assembly is configured to fluidly couple a respective fluid pump 32 to the high-pressure conduit assembly 30. In certain embodiments, each connection assembly includes a support bracket configured to provide support for connectors and/or hoses coupled to high-pressure inlets 42 of the high-pressure conduit assembly 30. For example, each high-pressure inlet 42 of the high-pressure conduit assembly 30 may be coupled to a connector of a high-pressure flexible hose in fluid communication with a respective pump 32. The support bracket may have an arm portion (e.g., adjustable arm portion, fixed arm portion) configured to extend across and engage (e.g., abut) a component of the high-pressure block (e.g., an upper surface of a high-pressure block of the high-pressure conduit assembly 30 having the high-pressure inlets 42, an outer diameter of a flanged connection bolted to the high-pressure block, a steel plate disposed on the upper surface of the high-pressure block, etc.). One or more supports (e.g., clamps, J-hook bolt support, plate support, U-bolt support, polygonal support) may extend from the arm portion, and each support may be configured to at least partially circumscribe (e.g., surround) a respective connector (or other component of the high-pressure inlet 42) to provide support for the connector, thereby reducing cyclic loading fatigue on the connector and the high-pressure inlets 42. In certain embodiments, a threaded rod may be directly attached to a component of the high-pressure block to provide support for the connector and/or hose, as discussed in greater detail below. In certain embodiments, each of the supports extending from the arm portion may also be adjustable (e.g., along a vertical axis), thereby enabling different loads coupled to respective high-pressure inlets 42 to be supported, as discussed in greater detail below. Because one or more components of the support bracket are configured to engage with (e.g., abut, thread into) a component of the high-pressure block of the high-pressure conduit assembly 30, additional components used to support the connectors may be omitted while still reducing cyclic loading fatigue on the connectors and the high-pressure inlets 42. Indeed, the support brackets discussed herein may be secured to a component of the high-pressure block in such a manner that enables the support bracket to apply an upward pulling force to the connector and/or other component of the high-pressure inlet 42. In this way, the support bracket may reduce the replacement frequency of the connectors and/or the high-pressure inlets 42, thereby reducing fluid supply system maintenance costs and downtime. Additionally, by obviating additional components to support the connectors, assembly and construction costs of the fluid supply system 12 may also be reduced.

Figure 3:
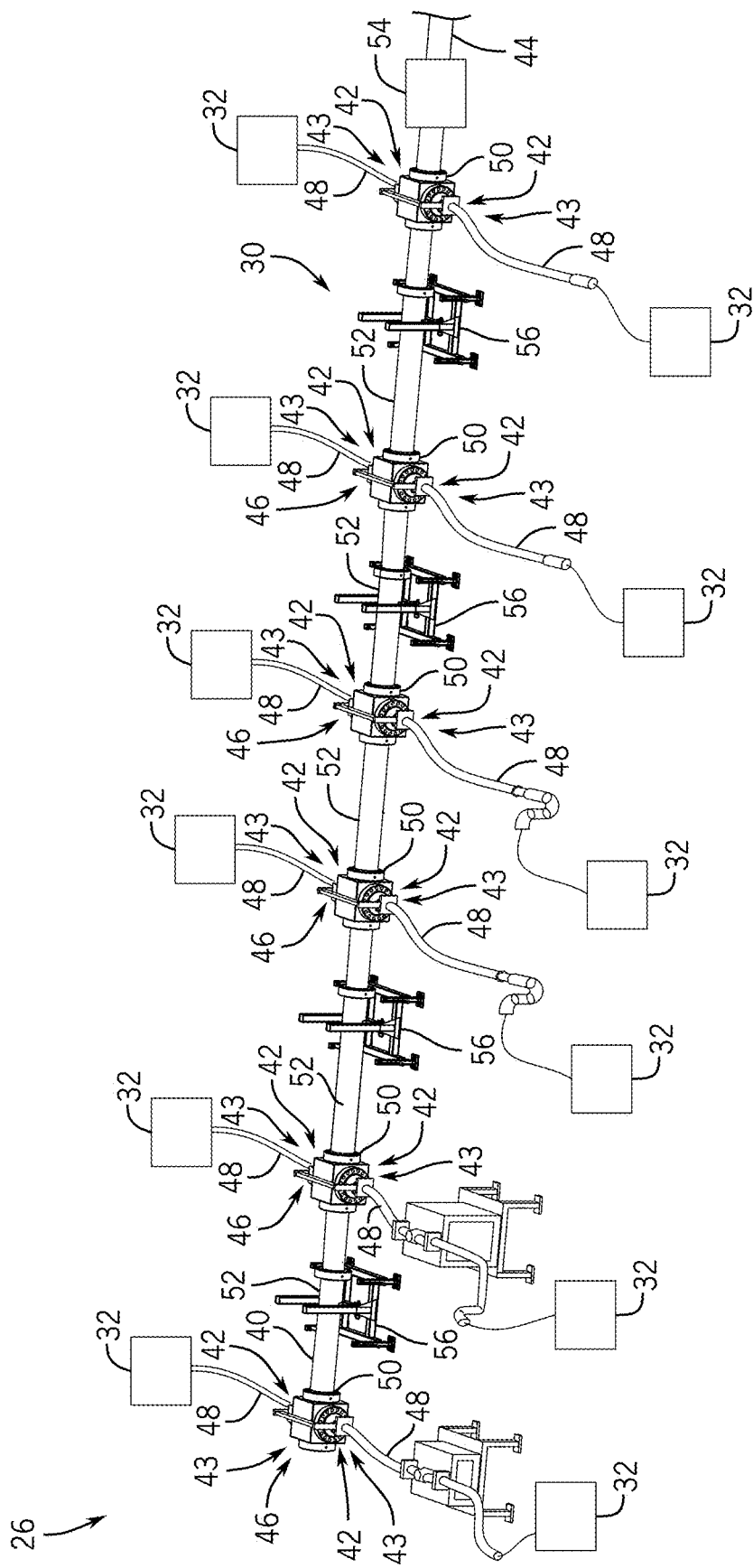
FIG. 3 is a perspective view of a portion of an embodiment of a fluid conduit assembly that may be employed within the well stimulation fluid supply system of FIG. 2, in accordance with aspects of the present disclosure.

FIG. 3 is a perspective view of a portion of an embodiment of a fluid conduit assembly 26 that may be employed within the well stimulation fluid supply system 12 of FIG. 2. In the illustrated embodiment, the fluid conduit assembly 26 includes a number of support brackets 46 each positioned on an upper surface of the high-pressure monobore conduit 40 of the high-pressure monobore conduit assembly 30. Each support bracket 46 is configured to reduce loads (e.g., lateral load(s), vertical load(s), longitudinal load(s)) on the high-pressure inlets 42 of the high-pressure conduit assembly 30 and on connectors 43 coupled to the high-pressure inlets 42. In the illustrated embodiment, a first end of each connector 43 is coupled to a respective high-pressure flexible hose 48 (e.g., high-pressure pipe), and a second end of each connector 43 is coupled to a respective high-pressure inlet 42 of the high-pressure conduit assembly 30. In some embodiments, the connector 43 may be a component of the high-pressure hose 48 (e.g., integrally coupled with an end of the high-pressure hose). Each high-pressure flexible hose 48 is fluidly coupled to a respective pump 32, thereby providing a flow path for the high-pressure fluid from the pumps 32 to the high-pressure conduit assembly 30 via the connectors 43 and the high-pressure inlets 42. As high-pressure fluid is directed from the pumps 32 to the high-pressure conduit 40 (e.g., via the flexible hoses 48, the connectors 43, and the high-pressure inlets 42), the high-pressure conduit 40 and the connectors 43 may experience cyclic loading fatigue at the high-pressure inlets 42.

Accordingly, in certain embodiments, support brackets 46 may be positioned on a component of the high-pressure conduit 40 (e.g., upper surface of an inlet module, upper surface of a high-pressure block, frame coupled to the inlet module, steel plate positioned on the upper surface on the inlet module), and each support bracket 46 may include one or more supports (e.g., clamps, J-hook bolt support, plate support, U-bolt support, polygonal support) configured to at least partially circumscribe the connectors 43 (or other component of the high-pressure inlet 42). For example, each support bracket 46 may include an arm portion (e.g., adjustable arm portion, fixed arm portion) positioned on an upper surface of the high-pressure monobore conduit 40, and a pair of supports may extend from the arm portion in a direction (e.g., vertical direction) along a vertical axis. Each of the supports may be configured to at least partially encapsulate (e.g., circumscribe) a respective connector 43 (or other component of the high-pressure inlet 42). Because the arm portion of each bracket 46 is positioned above the high-pressure inlets 42 with respect to gravity, as the supports of the support bracket 46 are engaged with the connectors 43, the support bracket 46 may bring the connectors 43 under tension, thereby reducing a load (e.g., lateral load, vertical load, longitudinal load) on each high-pressure inlet 42 and on the corresponding connector 43. Therefore, cyclic loading fatigue on the high-pressure inlets 42 of the high-pressure conduit assembly 30 and on the connectors 43 may be reduced. As a result, the replacement frequency of the high-pressure inlets 42 and/or the connectors 43 may be reduced, thereby reducing fluid supply system maintenance costs and downtime.

In certain embodiments, the fluid conduit assembly 26 may be formed from modules. For example, in the illustrated embodiment, the high-pressure monobore conduit assembly 30 includes inlet modules 50 (e.g., high-pressure blocks), spacer modules 52, and an outlet module 54. The modules may be coupled to one another by any suitable type(s) of separable connection(s) (e.g., flanged connection(s), connection(s) established by coupler(s), threaded connection(s), a GRAYLOC® coupling, a VICTAULIC® coupling, a WECO® coupling, etc.). Each inlet module 50 includes one or more respective high-pressure inlets 42, and the spacer modules 52 are configured to establish a desired spacing between the inlet modules 50. In the illustrated embodiment, the high-pressure outlet 44 is positioned at a longitudinal end of the outlet module 54. However, in other embodiments, the high-pressure outlet 44 may be positioned at any other suitable location within the high-pressure monobore conduit assembly 30. The length of the spacer modules 52 may be selected (e.g., from a set of spacer modules having different lengths) to substantially align each inlet module 50 with respective fluid pump(s) 32, thereby reducing the length of the conduit(s) (e.g., hose(s) 48, etc.) that fluidly couple the respective high-pressure inlet(s) 42 to the fluid pump(s) 32. In addition, the number of inlet modules 50 within the high-pressure monobore conduit assembly 30 and the number of fluid pumps 32 may be particularly selected for a particular application (e.g., target flow rate of the high-pressure fluid). In the illustrated embodiment, each of the support brackets 46 is positioned on an upper surface of a respective inlet module 50 to provide support for the connectors 43 associated with the respective inlet module 50 (e.g., to reduce a load on the connectors 43 and/or the respective high-pressure inlets 42). However, as noted above, the support brackets discussed herein may be secured to any component of the high-pressure block in such a manner that enables the support bracket to apply an upward pulling force to the connector and/or other component of the high-pressure inlet 42.

Because the high-pressure inlets 42 are formed on the inlet modules 50, the process of replacing worn inlet(s) may involve replacing the respective module(s), thereby substantially reducing the duration and costs associated with maintenance operations. While the inlet/outlet modules 50, 54 and the spacer modules 52 are separate components in the illustrated embodiment, in other embodiments, at least one inlet module 50 and/or at least one outlet module 54 may include an integrated spacer. In such embodiments, the respective spacer module(s) may be omitted and the longitudinal separation distance between respective inlets/outlets may be established by the integrated spacer(s). The integrated spacers may be available in multiple lengths to establish the desired longitudinal spacing between the respective inlets/outlets. Furthermore, in certain embodiments, at least one module may include multiple high-pressure inlets separated from one another by an integral spacer. In addition, while the high-pressure monobore conduit assembly 30 is formed by modules in the illustrated embodiment, in other embodiments, the high-pressure monobore conduit assembly 30 may be formed by any other suitable structural configuration, such as a structural configuration having a continuous high-pressure monobore conduit (e.g., with no connection joints along the high-pressure monobore conduit).

In the illustrated embodiment, the high-pressure monobore conduit assembly 30 is supported on the ground by multiple stands 56 (e.g., which may be directly engaged with the ground). The stands 56 may be formed from any suitable material (e.g., metal, such as steel, wood, polymeric material, composite material, etc.), and the stands 56 may be positioned at any suitable locations along the longitudinal extent of the fluid conduit assembly 26. While the fluid conduit assembly 26 includes four stands 56 in the illustrated embodiment, in other embodiments, the fluid conduit assembly 26 may include more or fewer stands (e.g., 1, 2, 3, 5, 6, 7, 8, 9, or more). Because the connectors 43 are supported by the support brackets 46 and the high-pressure monobore conduit assembly 30 is supported by the stands 56 (e.g., which directly engage the ground, which engage a plate/board positioned on the ground, etc.), the manufacturing cost and setup cost of the fluid conduit assembly 26 may be substantially reduced (e.g., as compared to a fluid conduit assembly in which the connectors are supported by the stands). For example, due to the tension forces provided by the support brackets 46 to the connectors 43, fewer stands 56 may be utilized to support the fluid conduit assembly 26 (e.g., as compared to a fluid conduit assembly in which each connector is supported by a stand). That is, by utilizing each of the inlet modules 50 as a mounting point for a support bracket 46, as compared to a respective stand, the number of additional components (e.g., stands) used to support the fluid conduit assembly 26 may be reduced. In certain embodiments, at least one stand 56 may include a height adjustment system configured to control a height of the high-pressure monobore conduit 40 above the ground, and/or a leveling system configured to enable the stand 56 to accommodate an uneven/sloped ground surface.

In the illustrated embodiment, the high-pressure monobore assembly 30 is fluidly coupled to twelve pumps 32. However, in other embodiments, the high-pressure monobore conduit assembly 30 may be coupled to more or fewer pumps 32 (e.g., 1, 2, 3, 4, 5, 6, 7, 8, 9, 10, 11, 13, 14, or more). Furthermore, in the illustrated embodiment, the high-pressure monobore conduit assembly 30 includes twelve high-pressure inlets 42 and twelve connectors 43, and twelve hoses 48. However, in other embodiments, the high-pressure monobore conduit assembly 30 may include more or fewer high-pressure inlets, connectors and hoses (e.g., 1, 2, 3, 4, 5, 6, 7, 8, 9, 10, 11, 12, 13, 14, or more). In addition, in other embodiments, the high-pressure hoses 48 may be high-pressure pipes and/or a combination of hoses and pipes configured to direct the high-pressure fluid from respective pumps 32 to respective high-pressure inlets 42. Similarly, in the illustrated embodiment, the high-pressure monobore conduit assembly 30 includes five support brackets 46. However, in other embodiments, the high-pressure monobore conduit assembly 30 may include more or fewer support brackets 46 (e.g., 1, 2, 3, 4, 6, 7, or more). Furthermore, in the illustrated embodiment, the high-pressure inlets 42 are positioned on both lateral sides of the high-pressure monobore conduit 40. However, in other embodiments, the high-pressure inlets 42 may be positioned on a single lateral side of the high-pressure monobore conduit 40. In addition, in the illustrated embodiment, the high-pressure monobore conduit assembly 30 includes one high-pressure outlet 44. However, in other embodiments, the high-pressure monobore conduit assembly 30 may include more high-pressure outlets 44 (e.g., 2, 3, 4, 5, 6, 7, or more). For example, the high-pressure monobore conduit assembly 30 may include one or more high-pressure outlets for each well stimulation manifold.

Figure 4:
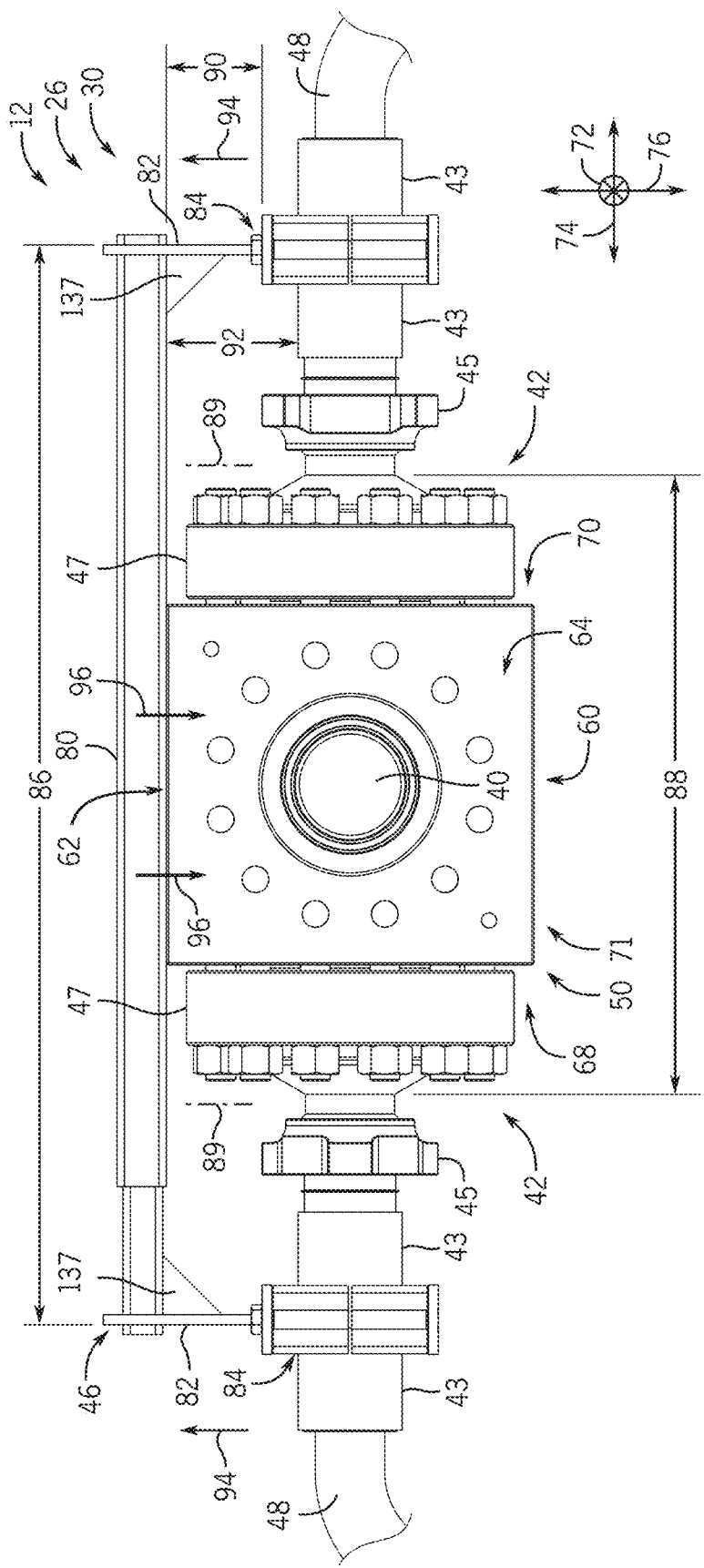
FIG. 4 is a perspective view of an embodiment of a support bracket positioned on an inlet module of the fluid conduit assembly of FIG. 3, in accordance with aspects of the present disclosure.

FIG. 4 is a perspective view of an embodiment of the support bracket 46 positioned on one of the inlet modules 50 of the fluid conduit assembly of FIG. 3. As illustrated, the inlet module 50 includes a first surface 60 (e.g., base, lower surface), a second surface 62 (e.g., upper surface) opposite the first surface 60, a third surface 64 (e.g., first longitudinal surface), a fourth surface 66 (e.g., second longitudinal surface) opposite the third surface 64, a fifth surface 68 (e.g., first lateral surface), and a sixth surface 70 (e.g., second lateral surface) opposite the fifth surface 68. Each of the first, second, third, fourth, fifth and sixth surfaces 60, 62, 64, 66, 68, 70 may collectively define a housing 71 of the inlet module 50. In some embodiments, the high-pressure monobore conduit 40 may extend in a direction (e.g., horizontal direction) along a longitudinal axis 72 of the fluid conduit assembly 26. For example, one spacer module may be coupled to the inlet module 50 at the third surface 64, and another spacer module may be coupled to the inlet module 50 at the fourth surface 66. Further, a flange 47 may extend from each of the fifth and sixth surfaces 68, 70 of the inlet module 50 in a direction (e.g., horizontal direction) along a lateral axis 74 of the fluid conduit assembly 26. Each of the flanges 47 may be configured to receive (e.g., couple to) a respective high-pressure inlet 42, thereby providing a flow path for high-pressure fluid from the pumps 32 into the inlet module 50. For example, as noted above, high-pressure fluid may be directed from the pumps 32, through the high-pressure hoses 48 (e.g., pipes) and into the high-pressure inlets 42 of the high-pressure monobore conduit assembly 30. Each high-pressure inlet 42 may be may be fluidly coupled to a respective high-pressure hose 48 via a respective connector 43. In certain embodiments, a collar 45 may be employed to secure a respective connector 43 to a respective high-pressure inlet 42. For example, the collar 45 may include a first end having threads configured to engage with threads of the high-pressure inlet 42 and a second end having a hammer union or wing nut configured to engage with (e.g., couple to) the connector 43, thereby fluidly coupling a respective connector 43 to a respective high-pressure inlet 42. In other embodiments, each high-pressure inlet 42 and each respective connector 43 may include threads and each end of the collar 45 may include threads configured to engage with the respective threads of the high-pressure inlet 42 and the connector 43 such that the collar 45 couples a respective high-pressure inlet 42 to a respective connector 43 via a threaded connection. That is, a respective collar 45 may be configured to engage the threads on both the high-pressure inlet 42 and the connector 43, thereby fluidly coupling a respective connector 43 to the respective high-pressure inlet 42. In the illustrated embodiment, each of the connectors 43 is a separate component configured to couple a respective hose to a respective high-pressure inlet 42. However, in other embodiments, the connector 43 may be a component of the high-pressure hose 48 (e.g., integrally coupled to the hose). Thus, the high-pressure fluid is directed through the high-pressure inlets 42 in a direction (e.g., horizontal direction) along the lateral axis 74, and upon reaching the high pressure monobore conduit 40, the fluid may change direction and travel along the longitudinal axis 72 of the fluid conduit assembly 26.

As noted above, the support bracket 46 is configured to reduce loads (e.g., lateral load(s), vertical load(s), longitudinal load(s)) on and/or provide support for the high-pressure inlets 42 and/or the connectors 43, thereby reducing cyclic loading fatigue on the high-pressure conduit assembly 30. While the hoses 48 are connected to the high-pressure inlets 42 via the connectors 43, the hoses 48 may apply loads to the connectors 43. For example, a weight of each hose 48 may apply a force (e.g., vertical load) to the respective connector 43 and/or the respective high-pressure inlet 42 in a downward direction (e.g., via gravity), and movement and/or adjustment of the hose 48 may apply a lateral force (e.g., lateral load, longitudinal load) to the respective connector 43 and/or the respective high-pressure inlet 42. Accordingly, embodiments of the support bracket 46 disclosed herein may be configured to reduce loads (e.g., lateral load(s), vertical load(s), longitudinal load(s)) applied to the connectors 43 and/or the high-pressure inlets 42.

In the illustrated embodiment, the support bracket 46 includes an arm 80 (e.g., adjustable arm, fixed arm), a pair of extensions 82, and a pair of supports 84 (e.g., clamps). A first end of each of the extensions 82 is coupled to a respective end of the arm 80, and a second end of each of the extensions 82 is coupled to a respective support 84. Each of the extensions 82 extend in a direction (e.g., vertical direction) along a vertical axis 76 of the fluid conduit assembly 26, such that each support 84 is at least partially disposed around a respective connector 43 between the respective high-pressure inlet 42 of the high-pressure conduit assembly 30 and the respective high-pressure hose 48. For example, in the illustrated embodiment, the arm 80 of the support bracket 46 is configured to abut the second surface 62 (e.g., upper surface) of the inlet module 50, and the arm 80 extends for a distance 86 (e.g., width) in a direction (e.g., horizontal direction) along the lateral axis 74 of the fluid conduit assembly 26. The housing 71 and the high-pressure inlets 42, collectively, may extend for a distance 88 (e.g., length) in a direction (e.g., horizontal direction) along the lateral axis 74 of the fluid conduit assembly 26. As illustrated, the length 86 of the arm 80 is greater than the width 88 of the housing 71 and the high-pressure inlets 42, such that each of the extensions 82 is positioned beyond a lateral boundary 89 of the high-pressure inlets 42. In this way, the extensions 82, which are coupled to the supports 84, may extend from the arm 80 in a direction (e.g., vertical direction) along the vertical axis 76 of the fluid conduit assembly 26 without contacting the housing 71 or the high-pressure inlets 42, thereby enabling the supports 84 to at least partially circumscribe the connectors 43 to reduce loads (e.g., lateral load(s), vertical load(s), longitudinal load(s)) on the high-pressure inlets 42 and/or the connectors 43, as described in greater detail below. Additionally, in certain embodiments, the length 86 of the arm 80 may be adjustable along the lateral axis 74, while in other embodiments, the length 86 of the arm 80 may be fixed, as described in greater detail below.

Each extension 82 extends from the arm 80 to a respective support 84 for a distance 90 (e.g., length, height) in a direction (e.g., vertical direction) along the vertical axis 76. The length 90 of the extension 82 may be based on a distance 92 between the connectors 43 and the second surface 62 of the inlet module 50. For example, the length 90 of the extensions 82 may be less than the distance 92 between the connectors 43 and the second surface 62 of the inlet module 50. Because the length 90 of each extension 82 is less than the distance 92 between the connectors 43 and the second surface 62 of the inlet module 50, as the supports 84 are tightened around the connectors 43, each extension 82 may be placed under tension, thereby producing an upward force on the corresponding connector 43 and high-pressure inlet 42. That is, because the length 90 of the extensions 82 is less than the distance 92 between the second surface 62 of the inlet module 50 and the connectors 43, as the supports 84 of the support bracket 46 are secured to the connectors 43, the arm 80 may flex and/or bend around the second surface 62 of the inlet module 50, and tension forces 94 may be generated as the inherent elasticity in the arm 80 urges the supports 84 upwardly along the vertical axis 76. Thus, as the support bracket 46 is secured to the inlet module 50, the arm 80, which is configured to abut the second surface 62 of the inlet module 50, may apply a force 96 in a direction (e.g., vertically downward direction) along the vertical axis 76 to the second surface 62 of the inlet module 50. In turn, as an amount of flexion of the support bracket 46 increases around the inlet module 50 (e.g., by decreasing the length 90 of the extensions 82), the tension forces 94 may increase. In this way, load(s) (e.g., lateral load(s), vertical load(s), longitudinal load(s)) on the high-pressure inlets 42 and/or the connectors 43 may be reduced as the tension forces 94 increase, thereby reducing wear on components of the fluid conduit assembly 26. In the illustrated embodiment, the supports 84 (e.g., clamps, Behringer clamps) of the support bracket 46 circumscribe the connectors 43 between the hoses 48 and the high-pressure inlets 42. However, as noted above, in other embodiments, the connectors 43 may be a component of the high-pressure hoses 48 (e.g., integrally coupled to the high-pressure hoses). Further, in the illustrated embodiment, the inlet module 50 includes two high-pressure inlets 42 disposed on opposite lateral sides of the inlet module 50 and each of the high-pressure inlets 42 is fluidly coupled to a respective pump 32 via a respective connector 43 and hose 48. However, in other embodiments having a single high-pressure inlet 42 and connector 43 disposed on a single lateral side of the inlet module 50, a false connector (e.g., pipe extending along the lateral axis 74 from the side of inlet module 50 opposite the high-pressure inlet 42 coupled to the pump 32) may be disposed in the opposite lateral side of the inlet module 50 (e.g., side not having a high-pressure inlet 42) such that a first support 84 of the support bracket 46 may circumscribe the respective connector 43 and a second support 84 of the support bracket 46 may circumscribe the false connector. In certain embodiments having a single high-pressure inlet 42, other connectors may be employed to generate the tension forces 94, as described in greater detail below with respect to FIG. 8. Additionally, in the illustrated embodiment, each of the supports 84 includes or corresponds to a clamp configured to circumscribe a respective connector 43. However, in other embodiments, a different type of support may be employed to support a respective connector 43, as discussed in greater detail below.

Figure 5:
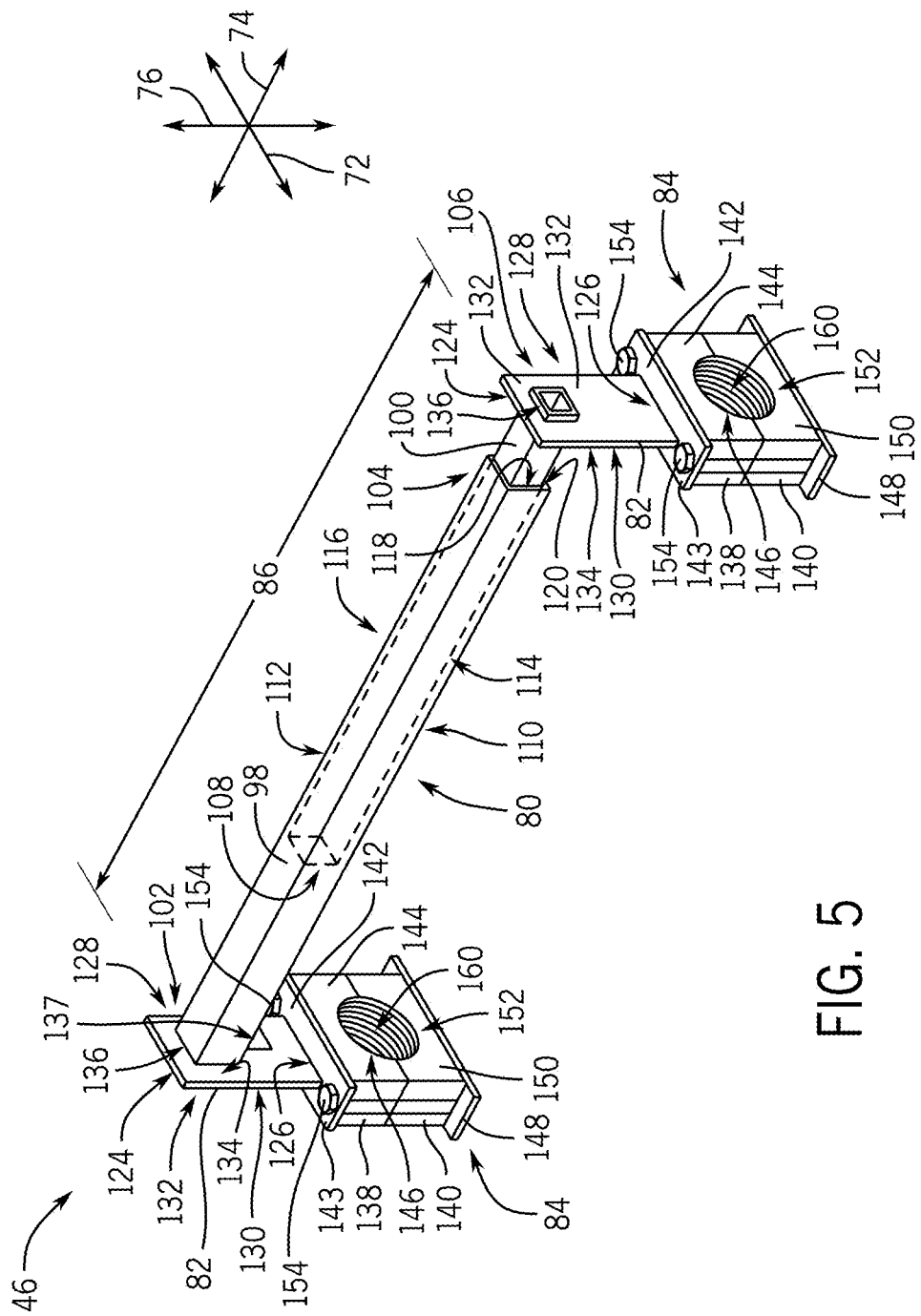
FIG. 5 is a perspective view of the support bracket of FIG. 4, in accordance with aspects of the present disclosure.

FIG. 5 is a perspective view of the support bracket 46 of FIG. 4. In the illustrated embodiment, the support bracket 46 includes the arm 80 (e.g., adjustable arm), a pair of the extensions 82 and a pair of the supports 84 (e.g., clamps). As noted above, in certain embodiments the arm 80 is an adjustable arm configured to extend across and engage (e.g., abut) a component of a respective inlet module (e.g., second surface 62) to generate tension forces on the clamps 84, thereby reducing loads (e.g., lateral load(s), vertical load(s), longitudinal load(s)) on the high-pressure inlets 42 and/or the connectors 43. For example, in the illustrated embodiment, the arm 80 (e.g., adjustable arm) includes a first portion 98 and a second portion 100. The first portion 98 includes a first end 102 and a second end 104, and the second portion 100 includes a first end 106 and a second end 108. Each of the first ends 102, 106 of the first and second portions 98, 100, respectively, is coupled to a respective extension 82. Further, the first portion 98 of the arm 80 includes a first surface 110 (e.g., bottom surface, lower surface), a second surface 112 (e.g., upper surface) opposite the first surface 110, a third surface 114, and a fourth surface 116 opposite the third surface 114. Each surface extends from the first end 102 of the first portion 98 to the second end 104 of the first portion 98 in a direction (e.g., horizontal direction) along the lateral axis 74 in an assembled configuration of the support bracket 46 with a respective inlet module 50. The first surface 110 of the first portion 98 of the arm 80 is configured to abut the second surface 62 of the inlet module 50, as described above. In the illustrated embodiment, the arm 80 has a rectangular prism shape having four surfaces. However, in other embodiments, the arm 80 may include other shapes (e.g., cylindrical, elliptical, triangular prism, pentagonal prism) having more or fewer surfaces (e.g., 1, 2, 3, 5, 6, 7, or more).

In the illustrated embodiment, the arm 80 may be configured to extend for the distance 86 (e.g., length) in a direction (e.g., horizontal direction) along the lateral axis 74 of the fluid conduit assembly 26. In certain embodiments, the length 86 of the adjustable arm 80 of the support bracket 46 may be modified based on a size (e.g., length, width) of the inlet module housing 71 and/or a size and/or position of the high-pressure inlets 42, connectors 43, and/or hoses 48 with which the support bracket 46 is associated. For example, each of the surfaces 110, 112, 114, 116 of the first portion 98 may define a cavity 118 configured to receive the second portion 100. For example, the second end 104 of the first portion 98 may include an opening 120 into the cavity 118 configured to receive the second portion 100. A cross-sectional area of the second portion 100 may be less than a cross-sectional area of the first portion 98, such that the cavity 118 of the first portion 98 may receive the second portion 100 via the opening 120 and at least partially encapsulate the second portion 100, thereby enabling the second portion 100 to translate in a direction (e.g., horizontal direction) along the lateral axis 74 relative to the first portion 98 of the adjustable arm 80. In this way, the length 86 of the arm 80 may be modified to accommodate various sizes of inlet modules having one or more high-pressure inlets 42, thereby enabling the support bracket 46 to reduce loads (e.g., lateral load(s), vertical load(s), longitudinal load(s)) on the high-pressure inlets 42 and/or the connectors 43 of various types of fluid conduit assemblies 26. In other embodiments, the arm 80 may be a fixed arm 80 having a fixed length 86. Thus, in embodiments in which the arm 80 is a fixed arm 80 having a fixed length 86, the fixed arm 80 may not include first and second portions, and instead, may include a single bar (or multiple bars that act as a single bar (i.e., welded together)) that extends for the fixed length 86. Additionally, in certain embodiments, the arm 80 may include more than two portions configured to interact with one another to define the arm 80. For example, in certain embodiments, the arm 80 may include a first portion, a second portion, and a third portion. A cross-sectional area of each of the second and third portions may be less than a cross-sectional area of the first portion, such that a cavity of the first portion may receive the second portion and the third portion and at least partially encapsulate the second portion and the third portion. For example, a first end of the first portion may include an opening configured to receive the second portion of the arm 80, and a second end of the first portion may include an opening configured to receive the third portion of the arm 80, thereby enabling the second portion and the third portion to translate in a direction (e.g., horizontal direction) along the lateral axis 74 relative to the first portion. In this way, the length 86 of the arm 80 may be adjusted.

As noted above, each of the first ends 102, 106 of the first and second portions 98, 100, respectively, is coupled to a respective extension 82. For example, each extension 82 may include a first edge 124 (e.g., upper edge), a second edge 126 (e.g., lower edge) opposite the first edge 124, a third edge 128, and a fourth edge 130 opposite the third edge 128. Each of the edges 124, 126, 128, 130 may define a first surface 132 (e.g., outer surface relative to the inlet module) and a second surface 134 (e.g., inner surface relative to the inlet module) of the extension 82. Each extension 82 may also include an opening 136 disposed through the first and second surfaces 132, 134 proximate the first edge 124 of the extension 82. The opening 136 may be configured to receive a respective first end 102, 106 of the first and second portions 98, 100, respectively, of the arm 80. In some embodiments, the first ends 102, 106 of the first and second portions 98, 100, respectively, may extend through the opening 136 and may be coupled to the extension 82 via welded connection(s). Further, in some embodiments, a brace 137 (e.g., welded support) may extend from the second surface 134 of a respective extension 82 to the arm 80 (e.g., first surface 110 of the first portion 98 of the arm 80, a bottom surface of the second portion 100 of the arm 80). While the arm 80 is coupled to each extension 82 via an end/opening interface and welded connection(s) in the illustrated embodiment, in other embodiments, the arm 80 may be coupled to the extension 82 via other suitable technique(s) (e.g., alone or in combination with the end/opening interface and/or the welded connection(s)). Further, in embodiments in which the arm 80 is a fixed arm 80, the fixed arm 80 may also include respective extensions 82 coupled to respective ends of the fixed arm 80.

In the illustrated embodiment, the second edge 126 of each extension 82 is coupled to a respective support 84 (e.g., clamp). In the illustrated embodiment, each of the clamps 84 includes a first portion 138 (e.g., upper portion) and a second portion 140 (e.g., lower portion), and the second edge 126 of each extension 82 may be coupled (e.g., via welding or any other suitable technique) to the first portion 138 of a respective clamp 84. In the illustrated embodiment, the first portion 138 of each clamp 84 includes a base 142 (e.g., plate) and a body 144 (e.g., half circle block, polymeric block). The base 142 of each first portion 138 defines a surface 143 configured to couple to a respective second edge 126 of each extension 82. In the illustrated embodiment, the second edges 126 of the respective extensions 82 are coupled to the surfaces 143 of the respective bases 142 of the first portions 138 of the clamps 84 via welding. However, in other embodiments, the extensions may be coupled to the clamps 84 via other suitable techniques. The body 144 of each first portion 138 includes a recess 146 configured to partially circumscribe a respective connector 43 of the fluid conduit assembly 26, as described in greater detail below. In addition, in the illustrated embodiment, each of the extensions 82 is illustrated as having a rectangular shape with four sides and two surfaces. However, in other embodiments, at least one extension 82 may have another shape (e.g., cylindrical bar, polygonal prism) having fewer or more surfaces (e.g., 1, 3, 4, 5, or more). Additionally, in certain embodiments, each of the extensions 82 may include a threaded rod that enables positional adjustment of the support connected thereto in a direction (e.g., vertical direction) along the vertical axis 76, as described in greater detail below.

In the illustrated embodiment, the second portion 140 of each clamp 84 also includes a base 148 (e.g., plate) and a body 150 (half circle block, polymeric block). Similar to the body 144 of a respective first portion 138, the body 150 of the second portion 140 also includes a recess 152 configured to partially circumscribe a connector 43 of the fluid conduit assembly 26. For example, the first portion 138 may be coupled to the second portion 140 of a respective clamp 84 via one or more fasteners 154. In the illustrated embodiment, the one or more fasteners 154 extend in a direction (e.g., vertical direction) along the vertical axis 76 through the base 142 and the body 144 of the first portion 138 and through the body 150 and the base 148 of the second portion 140 via holes disposed within the first portion 138 and the second portion 140. The holes enable the fasteners 154 to secure the first portion 138 to the second portion 140 of each clamp 84. In some embodiments, the holes may be threaded such that the one or more fasteners 154 engage with the threaded holes and draw the first and second portions 138, 140 of a respective clamp 84 toward one another. In other embodiments, the fasteners 154 may pass through the bases 142, 148 and the bodies 144, 150 of the first and second portions 138, 140, respectively, and may be secured to the respective bases 142, 148 via nuts. In the illustrated embodiment, each clamp 84 includes two fasteners 154. However, in other embodiments, fewer or more (e.g., 1, 3, 4, or more) fasteners 154 may be used. Further, in other embodiments, different connection mechanisms may be used to secure the first and second portions 138, 140 to one another including, but not limited to, pin(s), latch(es), and the like.

As noted above, each of the recesses 146, 152 of the first and second portions 138, 140, respectively, is configured to partially circumscribe a connector 43 in an assembled configuration. For example, in the illustrated embodiment, the body 144 of the first portion 138 and the body 150 of the second portion 140 are aligned along the longitudinal axis 72 and the lateral axis 74, such that the recesses 146, 152 of the first and second portions 138, 140 also align along the longitudinal axis 72 and the lateral axis 74. Upon coupling the first portion 138 of a respective clamp 84 to a second portion 140 of the respective clamp 84 via the fasteners 154, the recesses 146, 152 form a passage 160. For example, the arm 80, the extensions 82, and the first portion 138 of each of the clamps 84 may be coupled together. The arm 80 may be positioned on an upper surface of an inlet module 50, and the first portion 138 of each clamp 84 may be positioned on an upper surface of a respective connector 43. The second portion 140 of each clamp 84 may then be coupled to a respective first portion 138 via the fasteners 154, thereby forming the passage 160 that fully circumscribes the respective connector 43. In this way, the connectors 43 may be supported, thereby reducing loads (e.g., lateral load(s), vertical load(s), longitudinal load(s)) on the high-pressure inlets 42 and/or the connectors 43. In the illustrated embodiment, the recesses 146, 152 of the first and second portions 138, 140 are semi-circular, such that the passages 160 generally have a circular shape. However, in other embodiments, the recesses may be shaped based on a geometric profile of the connectors 43, such that the passages 160 may circumscribe the connectors 43. Further, in the illustrated embodiment, the clamps 84 of the support brackets 46 are Behringer clamps. However, in other embodiments, the clamps may be any suitable clamp configured to reduce a load on the high-pressure inlets 42 and/or the connectors 43 of the fluid conduit assembly 26. Further, in certain embodiments, each of the extensions 82 may be configured to enable positional adjustment of the respective support 84 coupled thereto in a direction (e.g., vertical direction) along the vertical axis 76, as described in greater detail below. Further still, in certain embodiments, the arm 80 may include extensions extending from a bottom surface of the arm 80, and the extensions may be configured to abut a component of the inlet module 50 (e.g., flange 47) such that the arm 80 is positioned above the inlet module 50 in a direction (e.g., vertical direction) along the vertical axis 76, as described in greater detail below with respect to FIG. 7.

Figure 6:
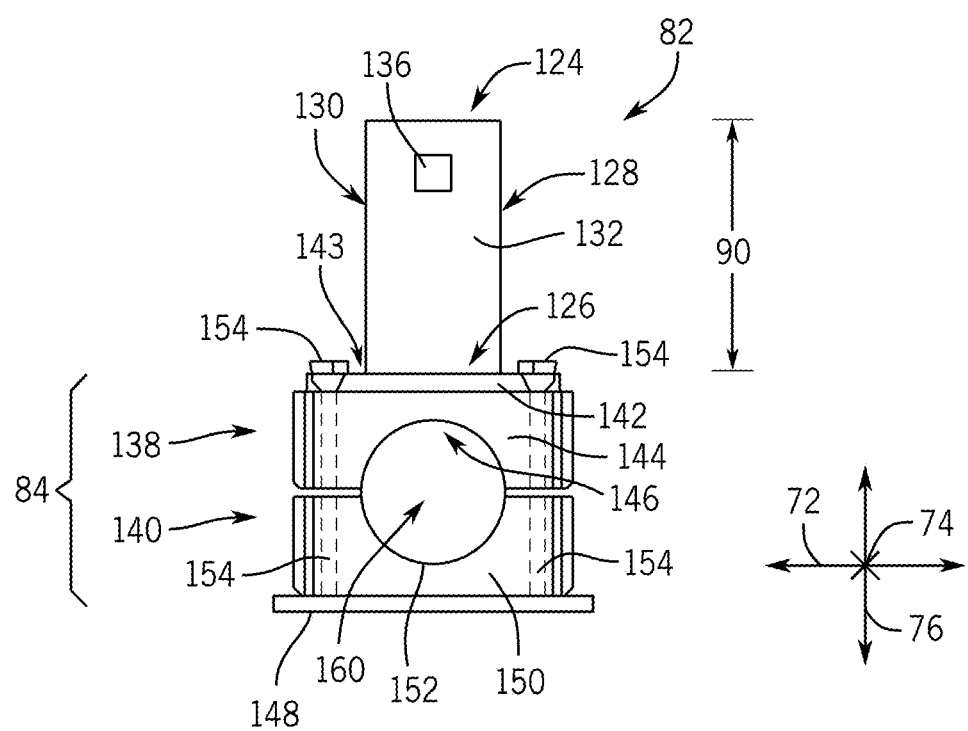
FIG. 6 is a side view of an extension and a respective support of the support bracket of FIG. 4, in accordance with aspects of the present disclosure.

FIG. 6 is a side view of one of the extensions 82 and a respective support 84 (e.g., clamp) of the support bracket of FIG. 4. In the illustrated embodiment, the extension 82 includes the opening 136 configured to receive a respective end of the arm 80, as described above. Further, the fasteners 154 are illustrated as passing through the first and second portions 138, 140 of the clamp 84 to secure the first and second portions 138, 140 to one another, thereby forming the passage 160. In the illustrated embodiment, the first and second portions 138, 140 and the respective recesses 146, 152 are aligned along both the longitudinal axis 72 and the lateral axis 74, such that the passage 160 is formed along the lateral axis 74. In this way, in an assembled configuration of the fluid conduit assembly 26, the connectors 43 which extend from the high-pressure monobore conduit assembly 30 in a direction along the lateral axis 74, may be supported by the clamps 84.

In the illustrated embodiment, the extensions 82 extend for the distance 90 in a direction (e.g., vertical direction) along the vertical axis 76. As noted above, the distance 90 may be based on a distance (e.g., distance 92) between an upper surface of an inlet module and a respective connector. For example, in certain embodiments, the distance 90 may be less than the distance between the upper surface 62 of the inlet module 50 and the respective connector 43, such that the recess 146 of the first portion 138 does not directly engage with the respective connector 43 in an unassembled configuration (e.g., when the second portion 140 is not coupled to the first portion 138). As the fasteners 154 are tightened, a distance between the first and second portions 138, 140 decreases. As the distance between the first portion 138 and the second portion 140 decreases, the extensions 82 may come under tension, thereby imparting an upward pulling force (e.g., tension forces 94) on the connector 43 and/or hose 48 and the high-pressure inlet 42. For example, as the arm 80 flexes around the inlet module 50, the inherent elasticity in the arm 80 may generate the tension forces 94 on the connector 43 and/or hose 48 and the high-pressure inlet 42. In this way, the tension forces 94 may support (e.g., lift) the connectors, thereby reducing load(s) on the high-pressure inlets 42 and/or the connectors 43.

Figure 7:
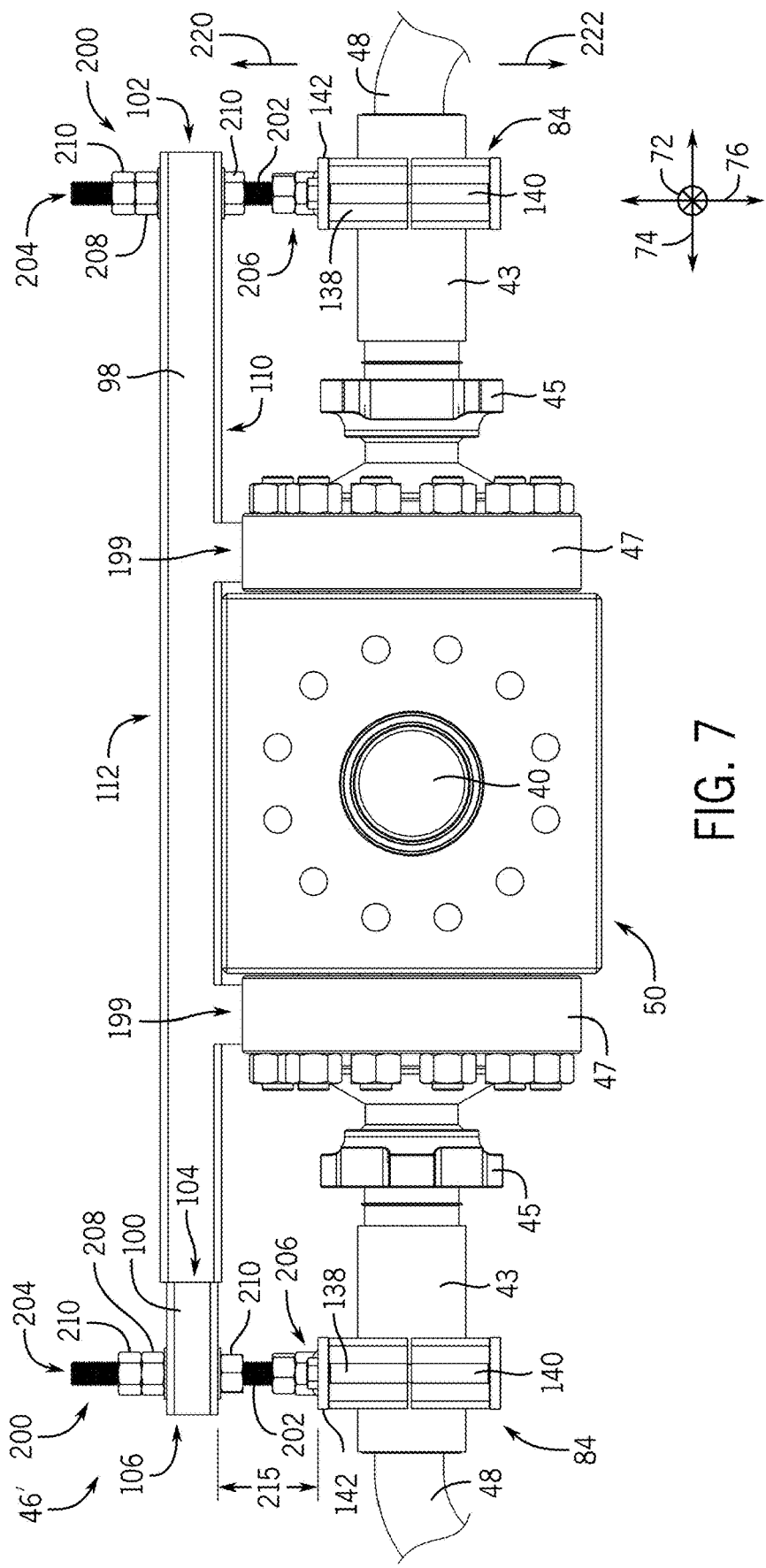
FIG. 7 is a front view of another embodiment of a support bracket having vertically adjustable extensions, in accordance with aspects of the present disclosure.

As noted above, in certain embodiments, the support bracket 46 may also be adjustable in a direction (e.g., vertical direction) along the vertical axis 76. For example, FIG. 7 is a front view of an embodiment of a support bracket 46' having extensions 200 (e.g., adjustable extensions, vertically adjustable extensions) that enable the support bracket 46' to support varying loads coupled to a respective inlet module 50. Additionally, by employing the extensions 200, a single size support bracket may accommodate inlet modules having varying sizes and/or configurations because the extensions 200 enable vertical adjustment of the support 84 coupled thereto to different centerlines and/or locations of support. In certain embodiments, the extensions 200 (e.g., adjustable extensions) may replace the extensions 82 disclosed above with reference to FIGS. 4-6. In the illustrated embodiment, each of the extensions 200 includes a threaded rod 202, and each extension 200 has a first end 204 and a second end 206 (e.g., corresponding to the first and second ends of the threaded rod 202). A portion of each adjustable extension 200 (e.g., proximate to the first end 204) may be configured to extend through the arm 80 (e.g., via a hole disposed through the first portion 98 proximate to the first end 102 or a hole disposed through the second portion 100 proximate to the second end 106). The second end 206 of each extension 200 may be configured to couple to a respective support 84 (e.g., clamp, J-hook bolt support, plate support, U-bolt support, polygonal support). For example, in certain embodiments, at the second end 206 of a respective extension 200, the threaded rod may be configured to thread into a threaded hole disposed within the first portion 138 of a respective clamp 84. In other embodiments, the adjustable extension 200 may be secured to a respective support 84 (e.g., clamp) at the second end 206 via other suitable techniques including welding, fasteners, pins, bolts, and the like.

In the illustrated embodiment, each of the extensions 200 includes one or more nuts configured to maintain a position of the extension 200 relative to the adjustable arm 80 and/or to enable modification of a position of the adjustable extension relative to the adjustable arm 80 (e.g., enable positional adjustment of the supports 84 in a direction (e.g., vertical direction) along the vertical axis 76). For example, each extension 200 may include a threaded nut 208 coupled to the threaded rod 202 proximate to the first end 204 of the extension 200. In an assembled configuration, the threaded rod 202 may extend through the arm 80 such that the first end 204 of the extension 200 is positioned above the arm 80 relative to gravity. Thus, in the assembled configuration, the threaded nut 208 may be secured to the threaded rod 202 proximate to the first end 204 of the extension 200 and at a position above the arm 80. For example, the threaded nut 208 may be secured to the threaded rod 202 such that the threaded nut 208 is disposed above the second surface 112 of the first portion 98 or above an upper surface of the second portion 100 of the arm 80. The threaded nut 208 may be configured to rotate, thereby enabling positional adjustment of the support 84 coupled thereto in a direction (e.g., vertical direction) along the vertical axis 76. For example, upon rotating the threaded nut 208 in a first direction (e.g., clockwise direction), threads of the threaded rod 202 may engage with threads of the threaded nut 208, thereby causing the second end 206 of the extension 200 to move in a direction 220 along the vertical axis 76 toward the threaded nut 208. Conversely, upon rotating the threaded nut 208 in a second direction (e.g., counter-clockwise direction), the second end 206 of the extension 200 may move away from the threaded nut 208 in a direction 222 along the vertical axis 76. Thus, upon rotating the threaded nut 208, a length 215 (e.g., height) of the extension 200 between the arm 80 and the support 84 may be adjusted. The length 215 of the extension 200 may correspond to a distance between a bottom surface of the arm 80 (e.g., first surface 110 of the first portion 98, bottom surface of the second portion 100) and an upper surface of the respective support 84 coupled thereto (e.g., base 142 of the first portion 138).

Thus, in an assembled configuration, upon coupling a support 84 (e.g., clamp) to a respective hose 48 and/or connector 43, the threaded nut 208 of a respective extension 200 may be rotated (e.g., in a clockwise direction) such that the threaded rod 202 moves in the direction 220 (e.g., upward direction) along the vertical axis 76. As the threaded rod 202 and respective support 84 coupled thereto travels in the direction 220 (e.g., upward direction) along the vertical axis 76, the extension 200 may be placed under tension, thereby imparting an upward pulling force (e.g., tension forces 94) on the hose 48 and/or connector 43 supported by the respective support 84. In this way, the the load(s) on the hose 48 and/or connector 43 may be reduced, as discussed above. In certain embodiments, the vertical positioning of each support 84, and thus the length 215 of a respective extension 200, may be selected based on an expected load on the component to which the support 84 may be coupled. For example, in response to determining the expected load, the length 215 of the extension 200 may be adjusted such that the support 84 is positioned to provide a pre-load on the connector 43 and/or hose 48 that at least partially counteracts the expected load. Further, by employing the extensions 200, different loads may be supported by the support bracket 46'. Further still, in certain embodiments, the length 215 of each extension 200 may be based on the particular load associated with the respective extension 200. For example, in certain embodiments, a first extension 200 may be configured to support a first load having a first weight, and a second extension 200 may be configured to support a second load having a second weight, in which the first and second weights are different. Thus, in certain embodiments, the first extension 200 may have a first length 215 that enables the respective support 84 coupled thereto to provide a first pre-load that at least partially counteracts the first weight of the first load, while the second extension 200 may have a second length 215, different from the first length 215, that enables the respective support 84 coupled thereto to provide a second pre-load that at least partially counteracts the second weight of the second load.

In certain embodiments, each extension 200 may also include one or more jam nuts 210 configured to maintain a position of the extension 200 (and support 84 coupled thereto) relative to the adjustable arm 80. The jam nuts 210 may be configured to limit an amount of movement of the threaded rod 202 of the extension 200 relative to the threaded nut 208 and/or movement (e.g., rotation) of the threaded nut 208 such that each of the supports 84 maintains its position relative to the adjustable arm 80. For example, an operator may first rotate (e.g., adjust) the threaded nut 208 to achieve a desired length 215 of the extension 200. Subsequently, the operator may rotate the jam nut 210 positioned below the arm 80 such that the jam nut 210 contacts (e.g., engages) with the arm 80 to block movement of the extension 200 in a direction (e.g., upward direction) along the vertical axis 76. The operator may then move (e.g., rotate) the jam nut 210 positioned above the arm 80 into contact with the threaded nut 208 to block rotation of the threaded nut 208. Thus, in an assembled configuration, the threaded nut 208 may be positioned between the jam nuts 210. Further, in certain embodiments, the threaded rod 202 may include a portion proximate the second end 206 that is not threaded. That is, the threaded rod 202 may be positioned above a non-threaded component of the extension 200, and the non-threaded component may be coupled to a respective support. Additionally, in certain embodiments, the extensions 200 may be replaced with a ratchet mechanism that enables vertical positional adjustment of a support coupled to the ratchet mechanism.

In the illustrated embodiment, the arm 80 includes additional extensions 199 configured to abut (e.g., engage) the flanges 47. The additional extensions 199 may protrude from a bottom surface of the arm 80 and may be configured to engage with the flanges 47, such that the arm 80 is supported by the flanges 47. In this way, the arm 80 may be positioned above the inlet module 50 while still enabling the extensions 200 to impart the upward pulling force on the supports 84, connectors 43, the hoses 48, and/or the high-pressure inlets 42. In other embodiments, the extensions 199 may be configured to abut an upper surface (e.g., second surface 62) of the inlet module 50.

Figure 8:
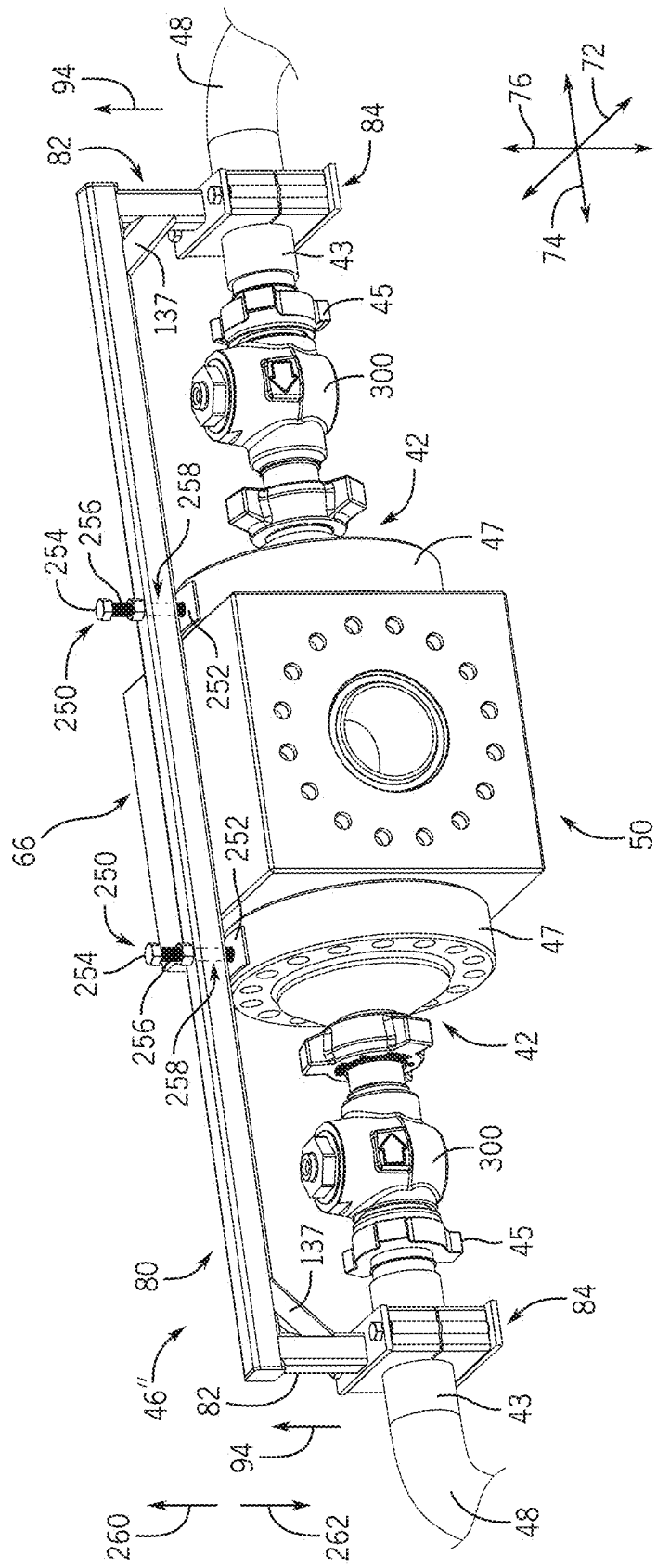
FIG. 8 is a perspective view of an embodiment of a support bracket having one or more levelers, in accordance with aspects of the present disclosure.

In certain embodiments, other components may be utilized to adjust a position of the arm 80 and/or the supports 84 along the vertical axis 76. For example, FIG. 8 is a perspective view of another embodiment of a support bracket 46" that may be adjustable along the vertical axis 76. In the illustrated embodiment, one or more levelers 250 are employed to enable positional adjustment of the arm 80 and/or the supports 84 along the vertical axis 76. Each leveler 250 may include a base 252, a head 254, and a threaded rod 256 extending between the base 252 and the head 254. In certain embodiments, the base 252 may be configured to rest on a surface (e.g., upper surface) of the flange 47. For example, each base 252 may have a contoured shape, geometry, or profile configured to match a shape, geometry, or profile of the flange 47. That is, a surface (e.g., lower surface) of the base 252 may be configured to engage (e.g., abut) a surface (e.g., upper surface) of the flange 47, and the geometry or profile of the base 252 may correspond to a geometry or profile of the flange 47, thereby enabling a stable engagement between the leveler 250 and the flange 47. In this way, a respective leveler 250 may engage with an inlet module 50 without mechanical securement (e.g., without fasteners, pins, latches, or the like). However, in other embodiments, the base 252 of a respective leveler 250 may be secured to the flange 47 via a mechanical securement. For example, in certain embodiments, one or more fasteners may extend through the base 252 and into the housing 47, thereby securing (e.g., coupling) a respective leveler 250 to the flange 47. Additionally, in certain embodiments, the base 252 may be omitted and the rod 256 may directly engage the flange 47.

In the illustrated embodiment, the arm 80 includes threaded ports 258 (e.g., threaded holes) configured to receive the threaded rod 256 of the leveler 250. For example, the threaded ports 258 may extend through the arm 80 in a direction (e.g., vertical direction) along the vertical axis 76, and threads of the threaded port 358 may engage with threads of the threaded rod 256 in an assembled configuration. The head 254 and the threaded rod 256 of the leveler 250 may be configured to rotate relative to the arm 80, thereby enabling the arm 80 to traverse along the threaded rod 256 in a direction (e.g., vertical direction) along the vertical axis 76. For example, upon rotating the head 254 of a respective leveler 250, which is integrally coupled to the threaded rod 256, in a first direction (e.g., clockwise direction), the threads of the threaded rod 256 may engage with the threads of the threaded port 258, thereby causing the arm 80 to move in a direction 260 (e.g., upward direction) away from the inlet module 50. Thus, in an assembled configuration, as the arm 80 moves in the direction 260 away from the inlet module 50, the extensions 82 may be placed under tension, and the supports 84 coupled to the arm 80 via the extensions 82 may also move in the direction 260. As the extensions 82 are placed under tension, the extensions 82 may impart an upward pulling force (e.g., lifting force, tension forces 94) on the connector 43 and/or hose 48 supported by each support 84, as discussed above. In certain embodiments, as the arm 80 is moved away from the inlet module 50 via rotation of the head 254 and the threaded rod 256 of the leveler 250 in the first direction, the upward pulling force imparted by the extensions 82 (e.g., lifting force, tension force 94) on the connector 43 and/or hose 48 may increase. Further, similar to the discussion above with respect to FIG. 7, by employing the levelers 250, different pre-loads may be placed on each connector 43 and/or hose 48 based on the expected load associated with the connector 43 and/or hose 48. Additionally, loads having varying magnitudes may be accounted for using the levelers 250. Conversely, upon rotating the head 254 of a respective leveler 250 in a second direction (e.g., counter-clockwise direction), the threads of the threaded rod 256 may engage with the threads of the threaded port 258, thereby enabling the arm 80 to move in a direction 262 (e.g., downward direction) toward the inlet module 50. As the arm 80 moves toward the inlet module 50 via rotation of the head 254 and the threaded rod 256 of the leveler 250 in the second direction, the tension force 94 on the extension 82 may decrease, thereby decreasing the upward pulling force on the connector 43 and/or hose 48 supported by the support 84. In this way, maintenance on various components of the support bracket 46" and/or the inlet module 50 may be facilitated due to the lack of tension force 94 (e.g., lack of an upward pulling force imparted from the extension 82) on each connector 43 and/or hose 48. While two levelers 250 are depicted in the illustrated embodiment, in other embodiments, fewer or more (e.g., one, three, four, five, or more) levelers 250 may be used. Further, while the extensions 82 are illustrated as having a fixed length, in other embodiments having the levelers 250, the extensions 200 discussed above may be employed, thereby enabling additional positional adjustment of the supports 84 coupled thereto in a direction (e.g., vertical direction) along the vertical axis 76. Further still, while the arm 80 is illustrated as having a fixed length, the arm 80 may also be adjustable in a direction (e.g., horizontal direction) along the lateral axis 74, as discussed above with respect to FIGS. 4 and 5.

Figure 9A:
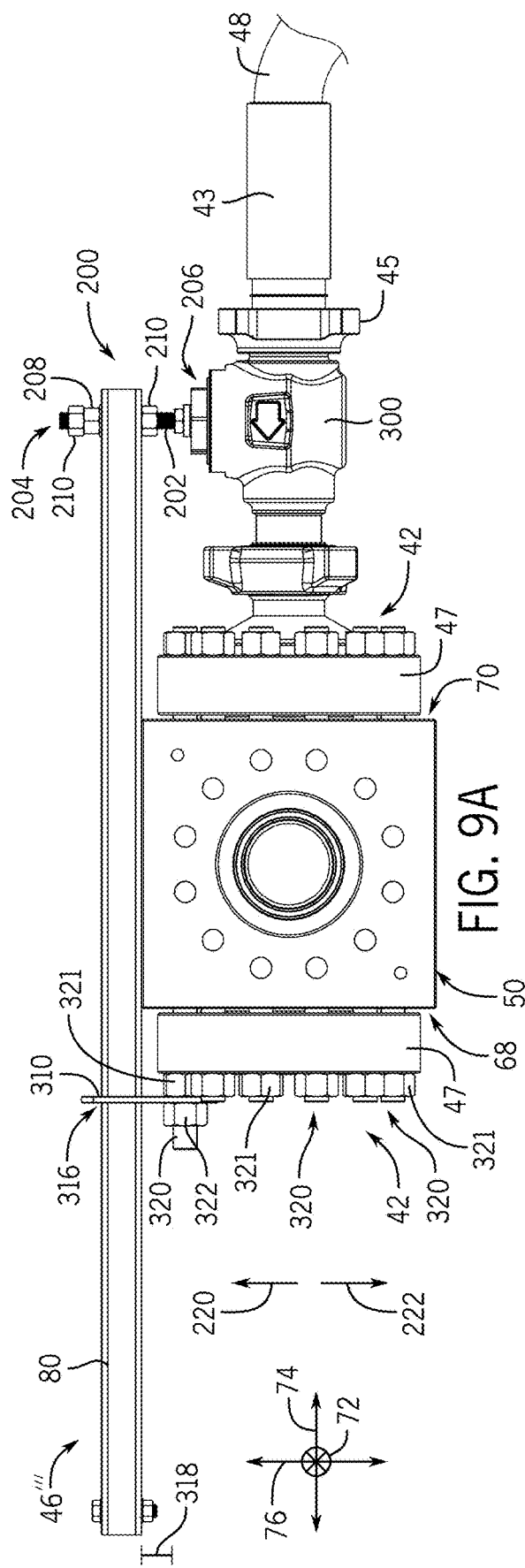
FIG. 9A is a front view of an embodiment of a support bracket having a single support, in accordance with aspects of the present disclosure.
Figure 9B:
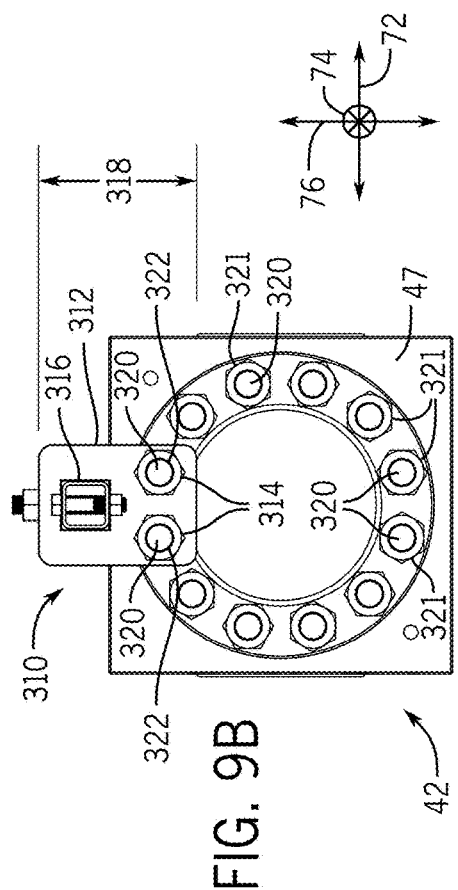
FIG. 9B is a side view of the support bracket of FIG. 9A.

FIG. 9A is a front view of an embodiment of a support bracket 46''' having a single support, and FIG. 9B is a side view of the support bracket 46''' of FIG. 9A. The support bracket 46''' may be adjustable along the vertical axis 76 and may include features of the support brackets discussed above. For example, in the illustrated embodiment, the support bracket 46''' includes an extension 200 (e.g., adjustable extension, vertically adjustable extension), similar to the extensions 200 discussed above with respect to FIG. 7. In the illustrated embodiment, the extension 200 includes a threaded rod 202, and the extension 200 has a first end 204 and a second end 206 (e.g., corresponding to the first and second ends of the threaded rod). A portion of the extension 200 (e.g., proximate to the first end 204) may be configured to extend through the arm 80 (e.g., via a hole disposed through a lower surface and an upper surface of the arm 80, via a hole extending through the arm 80 in a direction along the vertical axis 76). The second end 206 of the extension 200 may be configured to couple to an inlet valve 300 (e.g., check valve) of the high-pressure inlet 42. For example, the inlet valve 300 may include a threaded recess through an upper surface of the inlet valve 300, and the threaded recess may be configured to receive a portion of the threaded rod 202 proximate to the second end 206. In certain embodiments, the interface between the extension 200 and the inlet valve 300 may be secured via a welded connection or any other suitable technique. Further, while the extension 200 is illustrated as being coupled to an upper surface of the inlet valve 300, in other embodiments, the extension 200 may be coupled to other aspects of the inlet valve 300 (e.g., side, bottom, etc.). Similarly, in other embodiments, the extension 200 may be directly coupled to another aspect of the high-pressure inlet 50 (e.g., the flange 47, collar 45, etc.). Further still, in other embodiments, the extension 200 may be coupled to a support 84 configured to at least partially circumscribe the inlet valve 300, as discussed in greater detail below.

In the illustrated embodiment, the extension 200 includes a threaded nut 208 coupled to the threaded rod 202 proximate to the first end 204 of the extension 200. Similar to the embodiment discussed with reference to FIG. 7, in an assembled configuration, the threaded rod 202 may extend through the arm 80 such that the first end 204 of the extension 200 is positioned above the arm 80 relative to gravity. Thus, in an assembled configuration, the threaded nut 208 may be secured to the threaded rod 202 proximate to the first end 204 of the extension 200 and at a position above the arm 80. For example, in embodiments in which the arm 80 is an adjustable arm having the first and second portions 98, 100, the threaded nut 208 may be secured to the threaded rod 202 such that the threaded nut 208 is disposed above the second surface 112 of the first portion 98 or above an upper surface of the second portion 100 of the arm 80. As discussed above, the threaded nut 208 may be configured to rotate, thereby enabling the support bracket 46''' to apply an upward pulling force (e.g., tension forces 94) on the high-pressure inlet 42. For example, upon rotating the threaded nut 208 in a first direction (e.g., clockwise direction), threads of the threaded rod 202 may engage with threads of the threaded nut 208, thereby causing the second end 206 of the extension 200 to move in the direction 220 along the vertical axis 76 toward the threaded nut 208. Conversely, upon rotating the threaded nut 208 in a second direction (e.g., counter-clockwise direction), the second end 206 of the extension 200 may move away from the threaded nut 208 in the direction 222 along the vertical axis 76. Thus, upon rotating the threaded nut 208, a length 215 (e.g., height) of the extension 200 between the arm 80 and the inlet valve 300 may be adjusted. The length 215 of the extension 200 may correspond to a distance between a bottom surface of the arm 80 and an upper surface of the inlet valve 300 coupled thereto.

Thus, in an assembled configuration, upon coupling the threaded rod 202 to the inlet valve 300, the threaded nut 208 of the extension 200 may be rotated (e.g., in a clockwise direction) such that the threaded rod 202 moves in the direction 220 (e.g., upward direction) along the vertical axis 76. As the threaded rod 202 and respective inlet valve 300 coupled thereto travels in the direction 220, the threaded rod 202 may be placed under tension, thereby imparting an upward pulling force on the hose 48 and/or connector 43 coupled to the inlet valve 300. In this way, the load(s) on the high-pressure inlet 42 and corresponding connector 43 and/or hose 48 coupled to the high-pressure inlet 42 may be reduced, as discussed above. Additionally, in certain embodiments, the extension 200 may include one or more jam nuts 210 configured to maintain a position of the extension 200 (and inlet valve 300 coupled thereto) relative to the adjustable arm 80. Each of the jam nuts 210 may be configured to limit an amount of movement of the threaded rod 202 of the extension 200 relative to the threaded nut 208 such that the length 215 of the extension 200 is maintained. For example, an operator may first rotate the threaded nut 208 to achieve a desired length 215 of the extension 200. Subsequently, the operator may rotate the jam nut 210 positioned below the arm 80 such that the jam nut 210 contacts (e.g., engages) with the arm 80 to block movement of the extension 200 in a direction (e.g., upward direction) along the vertical axis 76. The operator may then move (e.g., rotate) the jam nut 210 positioned above the arm 80 into contact with the threaded nut 208 to block rotation of the threaded nut 208. Thus, in an assembled configuration, the threaded nut 208 may be positioned between the jam nuts 210.

Additionally, in the illustrated embodiment, only a single side (e.g., side corresponding to sixth surface 70) of the inlet module 50 includes a high-pressure inlet 42 coupled to a respective connector 43 and/or hose 48, while the other side (e.g., side corresponding to fifth surface 68) of the inlet module 50 does not include any connections (e.g., to a hose 48 and/or connector 43). As discussed above, in certain embodiments, a false connector may be employed to enable a support bracket (e.g., support bracket 46, support bracket 46', support bracket 46'', support bracket 46''') to impart an upward pulling force on the connector 43 and/or hose 48. However, in the illustrated embodiment, the false connector is omitted. Instead of employing a false connector, a plate 310 may be employed on the side of the inlet module 50 that does not include any connections (e.g., to a hose 48 and/or connector 43). In certain embodiments, the plate 310 may be coupled (e.g., mounted) to existing components of the inlet module 50 (e.g., the flange 47).

For example, the flange 47 may be secured to the inlet module 50 via a plurality of studs 320 and nuts 321. In certain embodiments, one or more of the studs 320 may have a length that extends for a greater distance away from the inlet module 50 in a direction (e.g., horizontal direction) along the lateral axis 74. Indeed, as illustrated by FIG. 9A, the studs 320 positioned at an upper perimeter (e.g., uppermost position relative to the vertical axis 76) extend for a greater distance away from the inlet module 50 relative to the other studs 320 employed to secure the flange 47 to the inlet module 50. The studs 320 extending away from the inlet module 50 for a greater distance may be configured to receive the plate 310 and the plate 310 may be secured to the studs 320 via an additional nut 322. For example, as illustrated in FIG. 9B, the plate 310 includes a body 312 having a pair of holes 314 (e.g., slots) extending therethrough. Each hole 314 may be configured to receive a stud 320 (e.g., fastener, pin, bolt, etc.), and a nut 322 may be employed to secure the plate 310 to the stud 320.

The plate 310 further includes a passage 316 (e.g., port) configured to receive the arm 80. For example, the arm 80 may extend through the plate 310 via the passage 316 such that the plate 310 extends from the arm 80 in a direction (e.g., vertical direction) along the vertical axis 76. The plate 310 may extend for a distance 318 (e.g., height, length) in a direction (e.g., vertical direction) along the vertical axis 76 such that the holes 314 of the plate 310 align with one or more of the studs 320 extending through the flange 47. In this way, stability of the arm 80 relative to the inlet module 50 may be increased, thereby enabling the extension 200 to impart an upward pulling force on the hose 48 and/or connector 43 coupled to the inlet valve 300, as described above. In certain embodiments, plates 310 having different lengths 318 and/or holes 314 having different sizes may be employed, thereby enabling the plates 310 to be secured to a flange 47 of an inlet module 50 having any suitable configuration. That is, an operator may select the plate 310 from a set of plates having varying lengths and/or hole 314 sizes, such that a length of the selected plate 310 corresponds to a desired length between the arm 80 and one or more studs 320 of the flange 47 and/or a hole size of the holes 314 corresponds to a size of the studs 320. For example, in certain embodiments, the plate 310 may extend for a distance 318 between the flange 47 and the arm 80, such that the holes 314 (e.g., slots) of the plate 310 substantially align with one or more studs 320 extending through the flange 47. Furthermore, although the plate 310 has a rectangular shape in the illustrated embodiment, in other embodiments, plates 310 having any suitable geometry and/or thickness may be employed.

FIGS. 10A-10E illustrate various embodiments of supports that may be employed in any of the embodiments of the support bracket discussed above. For example, each of the supports described below may be utilized in lieu of or in combination with the clamps discussed above with respect to FIGS. 4-8. Thus, each of the below described supports may be coupled to the arm 80 via an extension 82 (e.g., fixed extension) or via an extension 200 (e.g., adjustable extension, vertically adjustable extension). Additionally, in certain embodiments, the supports described herein may be configured to at least partially circumscribe (e.g., surround) and support a respective connector 43 and/or hose 48 coupled to a high-pressure inlet 42, as described in greater detail below.

Figure 10A:
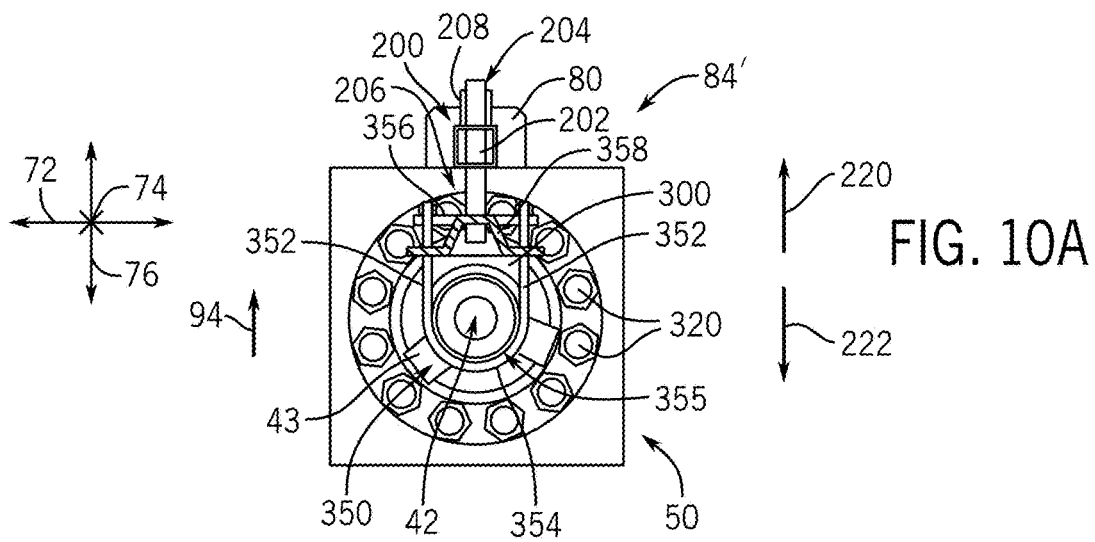
FIG. 10A is a side view of an embodiment of a U-bolt support that may be employed within a support bracket, in accordance with aspects of the present disclosure.
Figure 10B:
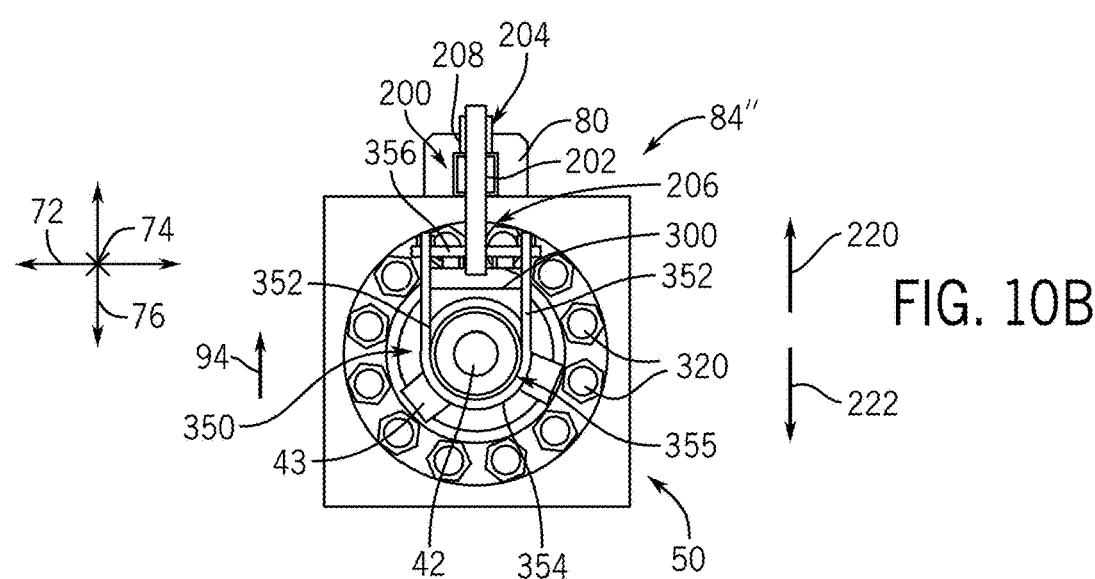
FIG. 10B is a side view of another embodiment of a U-bolt support that may be employed within a support bracket, in accordance with aspects of the present disclosure.

FIG. 10A is a side view of an embodiment of a U-bolt support 84' that may be employed within a support bracket, and FIG. 10B is a side view of another embodiment of a U-bolt support 84'' that may be employed within a support bracket. In the illustrated embodiments, each U-bolt support 84', 84'' includes a U-bolt 350 having first and second rods 352 and a body portion 354 (e.g., bent portion, curved portion) extending between the first and second rods 352. The body portion 354 may be configured to partially circumscribe a connector 43 and/or hose 48 coupled to the high-pressure inlet 42. For example, the body portion 354 may include a radially inward surface 355 configured to abut (e.g., engage) a portion of the connector 43 and/or hose 48 coupled to the respective high-pressure inlet 42 in an assembled configuration of the support bracket 46 with the inlet module 50. In certain embodiments, the body portion 354 may be configured to at least partially circumscribe the inlet valve 300. Additionally, each U-bolt support 84', 84'' may include a plate 356 extending in a direction (e.g., horizontal direction) along the longitudinal axis 72 to couple the first and second rods 352 to one another. The first and second rods 352 may be coupled to the plate 356 via fasteners, a welded connection, a threaded connection, or any other suitable technique. For example, each of the first and second rods 352 may extend through the plate 356 in a direction (e.g., vertical direction) along the vertical axis 76. A portion of each of the first and second rods 352 (e.g., a portion proximate the ends of the first and second rods 352) may be threaded and may be configured to receive a threaded nut. Thus, in as assembled configuration, the threaded portion of the first and second rods 352 may extend through the plate 356 and threaded nuts may be utilized to secure the first and second rods 352 to the plate 356. In certain embodiments, the plate 356 may be configured to provide structural rigidity to the supports 84', 84'', thereby enabling the supports 84', 84'' to accommodate various loads. In certain embodiments, the U-bolt supports may also include a brace configured to provide additional structural rigidity to the support. For example, as illustrated in FIG. 10A, a brace 358 extends between the first and second rods 352 of the U-bolt 350. Similar to the plate 356, the brace 358 may enable the support 84' to accommodate various loads on the high-pressure inlet 42. While the plate 356 is illustrated as being a flat component, in other embodiments, the plate 356 and/or the brace 358 may include any shape (e.g., bent or otherwise fabricated) that enables and/or facilitates assembly of the support 84', 84'' onto the arm 80 and/or connector 43 and hose 48. For example, the plate 356 and/or brace 358 may take on any shape that provides an amount of clearance between the support 84' 84'' and other components of the inlet module 50 (e.g., high-pressure inlet 42, collar 45, inlet valve 300, flange 47). Additionally, the shape of the plate 356 and/or brace 358 may enable the use of readily available U-bolts (e.g., standard length U-bolt).

In the illustrated embodiments, each U-bolt support 84', 84'' is coupled to the arm 80 via an extension 200 (e.g., adjustable extension, vertically adjustable extension). For example, each extension 200 may couple to the plate 356

(e.g., via a threaded connection, welding, or any other suitable technique), and the plate 356 may be coupled to the first and second rods 352 of the U-bolt support 84', 84" (e.g., via a welded connection, a threaded connection, or any other suitable technique. As discussed above with respect to FIG. 7, the extension 200 may include the threaded rod 202. In the illustrated embodiments of FIGS. 10A and 10B, a portion of the threaded rod 202 proximate to the second end 206 of the extension 200 extends through and is coupled to the plate 356 via a threaded connection. However, in other embodiments, the second end 206 of the extension 200 may be coupled to the plate 356 via a welded connection, or any other suitable technique. Additionally, a portion of the threaded rod 202 proximate the first end 204 of the extension 200 extends through the arm 80 in a direction (e.g., vertical direction) along the vertical axis 76, and the threaded nut 208 coupled to the threaded rod 202 of the extension 200 may engage an upper surface of the arm 80.

As discussed above, rotation of the threaded nut 208 in a first direction (e.g., clockwise direction) may cause the second end 206 of the threaded rod 202 to move in the direction 220 toward the arm 80. Thus, in an assembled configuration of each of the U-bolt supports 84', 84", as the threaded nut 208 is rotated in the first direction, the U-bolt support 84', 84" may travel in the direction 220 toward the arm 80, thereby imparting an upward pulling force on the connector 43 and/or hose 48 supported by the U-bolt support 84', 84". That is, because the U-bolt support 84', 84" is coupled to the threaded rod 202 (e.g., via the plate 356), as the threaded rod 202 moves, so too does the U-bolt support 84', 84" coupled thereto. In this way, as the upward pulling force on the connector 43 and/or hose 48 is increased, load(s) on the high-pressure inlet 42 may be reduced.

Figure 10C:
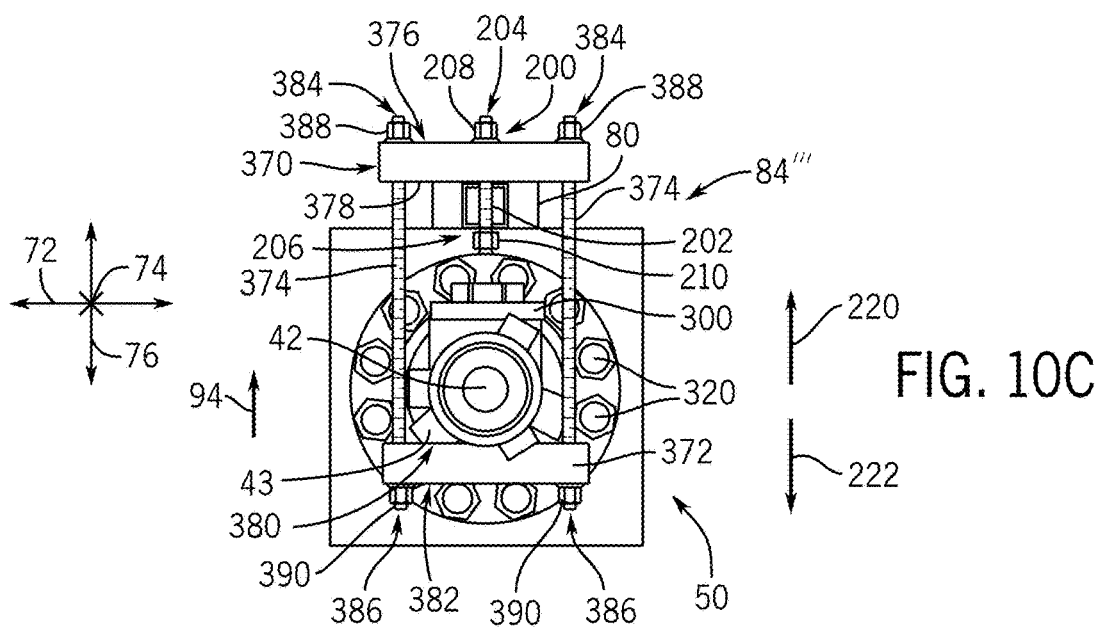
FIG. 10C is a side view of an embodiment of a plate support that may be employed within a support bracket, in accordance with aspects of the present disclosure.

FIG. 10C is a side view of an embodiment of a plate support 84''' (e.g., tube support) that may be employed within a support bracket discussed herein. The plate support 84''' may include a first plate 370 (e.g., upper plate, top plate, upper tube, top tube), a second plate 372 (e.g., lower plate, base plate, bottom plate, bottom tube, lower tube), and a pair of rods 374 (e.g., threaded rods) extending between the first plate 370 and the second plate 372, thereby coupling the first plate 370 and the second plate 372 to one another. The first plate 370 includes a first surface 376 (e.g., upper surface, top surface) and a second surface 378 (e.g., lower surface, bottom surface), and the second plate 372 includes a first surface 380 (e.g., upper surface, top surface) and a second surface 382 (e.g., lower surface, bottom surface). In an assembled configuration, the second surface 378 of the first plate 370 may be configured to abut (e.g., engage) an upper surface of the arm 80, and the first surface 380 of the second plate 372 may be configured to abut (e.g., engage) a lower surface of a connector 43 and/or hose 48 coupled to the high-pressure inlet 42, as discussed in greater detail below. While FIG. 10C illustrates the plate support 84''' as having plates 370, 372, in other embodiments, tubing (e.g., square tubing, polygonal tubing) may be utilized in lieu of the plates 370, 372.

In the illustrated embodiment, each rod 374 has a first end 384 and a second end 386. A portion of each rod 374 proximate to the first end 384 may extend through the first plate 370 such that the first end 384 is positioned above the first surface 376 of the first plate 370 relative to gravity. In certain embodiments, a threaded nut 388 may be coupled to the threaded rod 374 proximate to the first end 384, and the threaded nut 388 may engage the first surface 376 of the first plate 370. Contact between the threaded nut 388 and the first surface 376 blocks the rod from moving in the direction 222 via gravity, and contact between the second surface 378 of the first plate 370 and the upper surface of the arm 80 blocks the first plate 370 from moving in the direction 222 via gravity. Rotation of the threaded nut 388 may drive the rod 374 to move in the direction 220 or 222, as discussed in greater detail below. Similarly, a portion of each rod 374 proximate to the second end 386 may extend through the second plate 372 such that the second end 386 is positioned below the second surface 382 of the second plate 372 relative to gravity. A threaded nut 390 may be coupled to the threaded rod 374 proximate to the second end 386, and the threaded nut 390 may engage the second surface 382 of the second plate 372. Contact between the threaded nut 390 and the second surface 382 of the second plate 372 blocks movement of the second plate 372 in the direction 222 via gravity.

In the illustrated embodiment, each of the rods 374 may be a threaded rod configured to enable positional adjustment of the second plate 372 relative to the first plate 370 along the vertical axis 76. Thus, similar to the threaded nut 208 discussed above with respect to FIG. 7, each of the threaded nuts 388 may be configured to rotate, thereby enabling positional adjustment of the second plate 372 relative to the first plate 370 in a direction (e.g., vertical direction) along the vertical axis 76. For example, upon rotating the threaded nut(s) 388 in a first direction (e.g., clockwise direction), threads of the rod 374 may engage with threads of the threaded nut 388, thereby causing the second end 386 of the rod 374 to move in the direction 220 toward the arm 80. Because each rod 374 is coupled to the second plate 372 via the threaded nut 390, as the rod 374 moves in the direction 220, so too does the second plate 372, thereby imparting an upward pulling force on the connector 43 and/or hose supported by the second plate 372, as discussed above. Further, while FIG. 10C illustrates the threaded rods 374 being coupled to the plates 370, 372 via a threaded connection (e.g., via threaded nuts 388, 390), in other embodiments, one of the ends 388, 390 of each of the threaded rods 374 may be coupled to a respective plate 370, 372 via a welded connection. For example, in certain embodiments, the second end 386 of each threaded rod 374 may be coupled to the second plate 372 via a welded connection, and the threaded nuts 390 may be omitted. In this way, rotation of the threaded nuts 388 may still enable the plate support 84''' to impart an upward pulling force on the connector 43 and/or hose 48 supported by the second plate 372. Similarly, in certain embodiments, the first end 384 of each threaded rod 374 may be coupled to the first plate 370 via a welded connection, and the threaded nuts 388 may be omitted. In this way, rotation of the threaded nuts 390 may still enable the plate support 84''' to impart an upward pulling force on the connector 43 and/or hose 48 supported by the second plate 372.

Additionally, in certain embodiments, an extension 200 (e.g., adjustable extension, vertically adjustable extension) may be employed to couple the first plate 370 to the arm 80. As discussed above, the extension 200 includes the threaded rod 202, the first end 204, and the second end 206. A portion of the threaded rod 202 proximate the first end 204 may extend through the first plate 370 and through the arm 80 and may be secured to the first plate 370 via the threaded nut 208. A portion of the threaded rod 202 proximate the second end 206 may extend through the arm 80, and may be secured to a bottom surface of the arm 80 via the jam nut 210. In this way, the plate support 84''' may be secured to the arm 80, thereby enabling the plate support 84''' to impart an upward pulling force on the connector 43 and/or hose 48 supported by the second plate 372. Further, while the plate support 84''' is illustrated as supporting the connector 43 and/or hose 48, in other embodiments, the second plate 372 of the plate support 84''' may be configured to abut the inlet valve 300 such that the plate support 84''' imparts an upward pulling force on the inlet valve 300, thereby reducing loads on the high-pressure inlet 42.

Figure 10D:
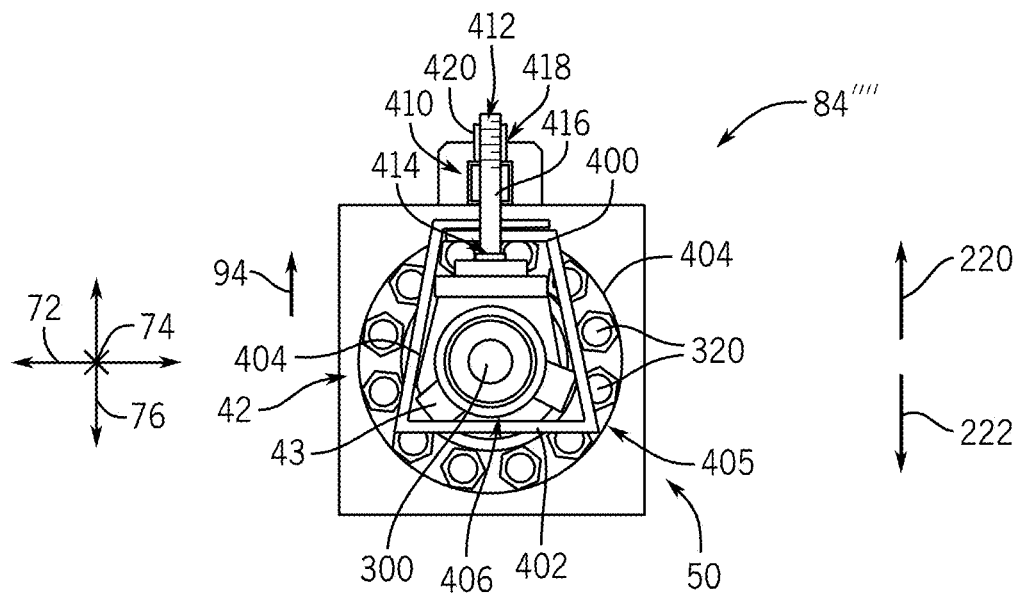
FIG. 10D is a side view of an embodiment of a polygonal support that may be employed within a support bracket, in accordance with aspects of the present disclosure.

FIG. 10D is a side view of an embodiment of a polygonal support 84'''' that may be employed with a support bracket discussed herein. In the illustrated embodiment, the polygonal support 84'''' may include a first plate 400 (e.g., upper plate, top plate), a second plate 402 (e.g., bottom plate, lower plate), and a pair of rods 404 extending from the first plate 400 to the second plate 402 at an angle relative to the vertical axis 76. The first plate 400, the second plate 402, and the rods 404 may collectively define a body 405 of the polygonal support 84''''. In certain embodiments, each of the first plate 400, the second plate 402, and the rods 404 may be coupled to one another via welding to form the body 405. However, other suitable techniques may be employed to secure each of the components (e.g., first plate 400, second plate 402, rods 404) to one another to form the body 405. The second plate 402 includes a first surface 406 (e.g., upper surface, top surface) configured to abut (e.g., engage) a lower surface of a connector 43 and/or hose 48 coupled to the high-pressure inlet 42. In certain embodiments, the body 405 may be formed from components other than rods and plates or may be formed entirely from a rod or plate, either with multiple pieces welded together or formed from a single rod or single plate that is bend to achieve the desired polygonal shape. While the polygonal support 84'''' is illustrated as supporting the connector 43 and/or hose 48, in other embodiments, the polygonal support 84'''' may be configured to circumscribe other aspects or components of the inlet module 50 or high-pressure inlet 42. For example, in certain embodiments, the polygonal support 84'''' may be configured to circumscribe the inlet valve 300, thereby enabling the polygonal support 84'''' to impart an upward pulling force on the inlet valve 300, as discussed above.

In the illustrated embodiment, the polygonal support 84'''' is coupled to the arm 80 via an extension 410. The extension 410 includes a first end 412, a second end 414, and a bolt 416 extending between the first end 412 and the second end 414. The bolt 416 may include a threaded portion 418 proximate the first end 412. A portion of the extension 410 proximate to the first end 412 may be configured to extend through the arm 80 in a direction along the vertical axis 76 such that the threaded portion 418 of the bolt 416 extends above the arm 80 relative to gravity. The second end 414 is configured to couple to the first plate 400 of the polygonal support 84'''' (e.g., via a threaded connection, via a welded connection, etc.).

In certain embodiments, the extension 410 may function similarly to the extension 200 discussed above. For example, in the illustrated embodiment, the extension 410 includes a threaded nut 420 configured to engage with the threads of the threaded portion 418, thereby enabling positional adjustment of the polygonal support 84'''' in a direction (e.g., vertical direction) along the vertical axis 76. Thus, upon rotating the threaded nut 420 in a first direction (e.g., clockwise direction), threads of the threaded portion 418 of the bolt 416 may engage with threads of the threaded nut 420, thereby causing the second end 414 of the extension 410 to travel in the direction 220 toward the arm 80. Because the second end 414 of the extension 410 is coupled to the polygonal support 84'''', as the second end 414 moves in the direction 220 toward the arm 80 (e.g., via rotation of the threaded nut 420 in the first direction), so too does the polygonal support 84'''' move in the direction 220 toward the arm 80. Thus, as the threaded nut 420 is rotated in the first direction, the first surface 406 of the second plate 402 may engage with the connector 43 and/or hose 48 or the inlet valve 300 coupled to the high-pressure inlet 42, thereby imparting an upward pulling force on the connector 43 and/or hose 48 or the inlet valve 300 (e.g., thereby providing the tension force 94 on the connector 43 and/or hose 48 or the inlet valve 300). In this way, loads on the high-pressure inlet 42 (e.g., from the connector 43 and/or hose 48) may be reduced or mitigated, as discussed above. While the polygonal support 84'''' has a trapezoidal shape in the illustrated embodiment, the illustrated shape is not intended to be limiting, and in other embodiments, the polygonal support 84'''' may take on other shapes and/or geometries (e.g., rectangular, triangular, pentagonal, etc.).

Figure 10E:
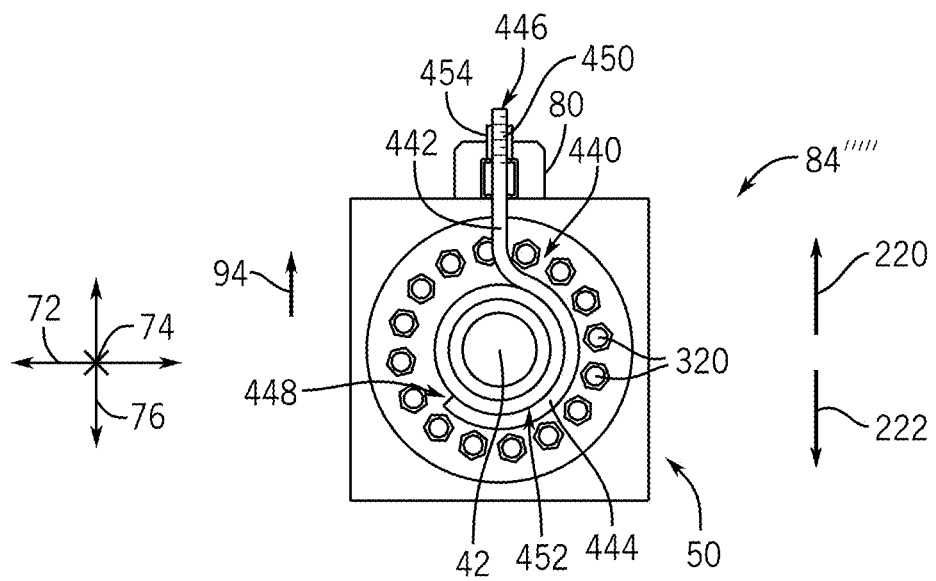
FIG. 10E is a side view of an embodiment of a J-hook bolt support that may be employed within a support bracket, in accordance with aspects of the present disclosure.

FIG. 10E is a side view of an embodiment of a J-hook bolt support 84''''' that may be employed within a support bracket discussed herein. In the illustrated embodiment, the J-hook bolt support 84''''' includes a body 440 having a first portion 442 (e.g., straight portion) and a second portion 444 (e.g., hooked portion, curved portion) extending between a first end 446 and a second end 448 of the J-hook bolt support 84'''''. The first portion 442 may include a threaded section 450 configured to extend through the arm 80 and to enable positional adjustment of the J-hook bolt support 84''''' in a direction (e.g., vertical direction) along the vertical axis 76, as discussed in greater detail below. The second portion 444 may be configured to at least partially circumscribe a connector 43, hose 48, and/or element of the high-pressure inlet 42 (e.g., inlet valve 300, collar 45, flange 47), thereby enabling the second portion 444 to support a weight of the connector 43, hose 48, and/or element of the high-pressure inlet 42 in an assembled configuration of the support bracket. For example, the second portion 444 may include a surface 452 (e.g., radially inward surface) configured to abut (e.g., engage) and at least partially circumscribe the connector 43 and/or hose 48 coupled to the high-pressure inlet 42.

Similar to the embodiments described above, the threaded section 450 of the J-hook bolt support 84''''' may be configured to engage with a threaded nut 454 to enable positional adjustment of the J-hook bolt support 84''''' in a direction (e.g., vertical direction) along the vertical axis 76. For example, upon rotating the threaded nut 454 in a first direction (e.g., clockwise direction), threads of the threaded section 450 of the J-hook bolt support 84 may engage with threads of the threaded nut 454, thereby causing the second portion 444 to move in the direction 220 toward the arm 80. Thus, as the threaded nut 454 is rotated in the first direction, the surface 452 of the second portion 444 may abut (e.g., engage) with the connector 43 and/or hose 48 coupled to the high-pressure inlet 42, thereby placing the connector 43 and/or hose 48 under tension (e.g., thereby providing the tension force 94 on the connector 43 and/or hose 48). In this way, loads on the high-pressure inlet 42 may be reduced or mitigated, as discussed above.

Certain components or features of each of the embodiments discussed herein may be used in combination with one another. For example, certain embodiments having the support bracket discussed herein may utilize the levelers 250 and the extensions 200 in combination with one another. In addition, in embodiments having a connector 43 and/or hose 48 coupled to each of the high-pressure inlets 42, different supports may be employed to reduce the load on the high-pressure inlet 42. For example, in certain embodiments, a connector 43 and/or hose 48 coupled to a first high-pressure inlet 42 of an inlet module 50 may be supported by a U-bolt support 84', 84" while a connector 43 and/or hose 48 coupled to a second high-pressure inlet 42 of the inlet module 50 may be supported by a clamp 84. As another example, a J-hook bolt support 84'''' may be utilized to impart an upward pulling force on a connector 43 and/or hose 48 coupled to a high-pressure inlet on a first side of an inlet module 50, and a direct threaded connection (e.g., as illustrated in FIG. 9A) to a component (e.g., inlet valve 300) may be utilized to impart an upward pulling force on a connector 43 and/or hose 48 coupled to a high-pressure inlet on a second side of the inlet module 50. Further, the examples above are not intended to be limiting, and other combinations of features disclosed herein may be utilized to reduce or mitigate loads on respective high-pressure inlets 42 of an inlet module 50.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A support bracket for a fluid supply system, comprising:
   an arm configured to extend across and engage with an upper surface of an inlet module of the fluid supply system, wherein the inlet module comprises a first high-pressure inlet and a second high-pressure inlet positioned on opposite sides of the inlet module;
   a first extension and a second extension extending from the arm in a direction along a vertical axis; and
   a first support coupled to the first extension and a second support coupled to the second extension, wherein the first support is configured to at least partially circumscribe a first connector coupled to the first high-pressure inlet, the second support is configured to at least partially circumscribe a second connector coupled to the second high-pressure inlet, and the support bracket is configured to transfer a first vertical load from the first connector to the inlet module and a second vertical load from the second connector to the inlet module based on the arm engaging with the upper surface of the inlet module.

2. The support bracket of claim 1, wherein the arm comprises a first portion and a second portion, the first portion defines a cavity configured to receive the second portion, and the second portion is configured to translate relative to the first portion to adjust a length of the arm.

3. The support bracket of claim 2, wherein a cross-sectional area of the second portion is less than a cross-sectional area of the first portion.

4. The support bracket of claim 2, wherein the length of the arm is adjustable based on a size of the inlet module, a position of the first connector, a position of the second connector, or any combination thereof.

5. The support bracket of claim 2, wherein a first end of the first portion of the arm is coupled to the first extension, and a first end of the second portion of the arm is coupled to the second extension.

6. The support bracket of claim 5, wherein the first end of the first portion is coupled to the first extension via a first welded connection and the first end of the second portion is coupled to the second extension via a second welded connection.

7. The support bracket of claim 1, wherein each of the first support and the second support comprises:
   a first portion having a first base and a first body, wherein the first body defines a first recess; and
   a second portion having a second base and a second body, wherein the second body defines a second recess, and the first body and the second body are configured to align along a longitudinal axis and a lateral axis such that the first and second recesses form a passage for a respective connector of the first connector or the second connector.

8. The support bracket of claim 7, wherein the first body and the second body each comprises a semi-circular block such that the first and second recesses form the passage having a circular shape.

9. The support bracket of claim 7, wherein the first portion and the second portion are coupled together via one or more fasteners.

10. The support bracket of claim 7, wherein the arm is configured to flex around the inlet module in response to decreasing a distance between the first portion and the second portion of each of the first support and the second support.

11. The support bracket of claim 1, wherein the support bracket is configured to transfer a third load from the first connector to the inlet module and a fourth load from the second connector to the inlet module, and each of the third load and the fourth load extends along a lateral axis, a longitudinal axis, or any combination thereof.

12. A fluid supply system, comprising:
   an inlet module comprising a first high-pressure inlet and a second high-pressure inlet, wherein the first high-pressure inlet and the second high-pressure inlet are disposed on opposite sides of the inlet module; and
   a support bracket configured to transfer a first vertical load from a first connector coupled to the first high-pressure inlet to an upper surface of the inlet module, transfer a second vertical load from a second connector coupled to the second high-pressure inlet to the upper surface of the inlet module, or both, the support bracket comprising:
   an arm configured to extend across the upper surface of the inlet module;
   one or more extensions extending from the arm in a direction along a vertical axis; and
   a support coupled to each extension of the one or more extensions, wherein each support is configured to at least partially circumscribe the first connector coupled to the first high-pressure inlet or the second connector coupled to the second high-pressure inlet.

13. The fluid supply system of claim 12, wherein the arm has a fixed length.

14. The fluid supply system of claim 12, wherein the arm comprises a first portion and a second portion, the first portion defines a cavity configured to receive the second portion, and the second portion is configured to translate relative to the first portion to adjust a length of the arm.

15. The fluid supply system of claim 12, wherein each of the one or more extensions is configured to adjust a position of the respective support coupled thereto in the direction along the vertical axis.

16. The fluid supply system of claim 15, wherein a portion of each of the one or more extensions is configured to extend through the arm in the direction along the vertical axis, and each extension of the one or more extensions comprises:
   a threaded rod; and
   a threaded nut configured to receive and engage the threaded rod, wherein rotation of the threaded nut is configured to adjust the position of the respective extension relative to the arm along the vertical axis.

17. The fluid supply system of claim 16, wherein each of the one or more extensions comprises one or more jam nuts configured to maintain the position of each of the one or more extensions along the vertical axis.

18. The fluid supply system of claim 12, wherein the support comprises a clamp configured to circumscribe the first connector or the second connector.

19. The fluid supply system of claim 12, comprising a leveler configured to adjust a position of the arm along the vertical axis, the leveler comprising:
   a base portion configured to abut a flange of the inlet module;
   a threaded rod configured to extend through a threaded port of the arm; and
   a head portion configured to rotate the threaded rod relative to the arm to drive the arm to move in a direction along the vertical axis.

20. A support bracket, comprising:
   an arm configured to extend across a surface of an inlet module of a fluid supply system;
   one or more extensions extending from the arm in a direction along a vertical axis
   one or more supports, wherein a first support of the one or more supports is configured to:
      couple to a first extension of the one or more extensions;
      at least partially circumscribe a connector coupled to a high-pressure inlet of the inlet module; and
      transfer a load from the connector to the inlet module; and
   a leveler configured to:
      abut a flange of the inlet module; and
      adjust a position of the arm along the vertical axis.

* * * * *